US012680557B2

(12) United States Patent
Raghuvaran et al.

(10) Patent No.: US 12,680,557 B2
(45) Date of Patent: Jul. 14, 2026

(54) FORWARD LOAD REDUCTION STRUCTURES FOR AFT-MOST STAGES OF HIGH PRESSURE COMPRESSORS

(71) Applicant: General Electric Company, Evendale, OH (US)

(72) Inventors: Vaishnav Raghuvaran, Bangalore (IN); Bhaskar Nanda Mondal, Bangalore (IN); Thomas Ory Moniz, Loveland, OH (US); Atanu Saha, Bangalore (IN); Vaibhav Deshmukh, Bangalore (IN); Curtis Walton Stover, Mason, OH (US); Andrew Mark Del Donno, Lynn, MA (US)

(73) Assignee: General Electric Company, Evendale, OH (US)

( * ) Notice: Subject to any disclaimer, the term of this patent is extended or adjusted under 35 U.S.C. 154(b) by 0 days.

(21) Appl. No.: 19/049,570

(22) Filed: Feb. 10, 2025

(65) Prior Publication Data

US 2025/0215894 A1    Jul. 3, 2025

Related U.S. Application Data

(63) Continuation of application No. 18/142,745, filed on May 3, 2023, now Pat. No. 12,247,580.

(51) Int. Cl.
F04D 29/54 (2006.01)
F01D 11/00 (2006.01)
(Continued)

(52) U.S. Cl.
CPC .......... F04D 29/544 (2013.01); F01D 11/001 (2013.01); F04D 19/02 (2013.01);
(Continued)

(58) Field of Classification Search
CPC ........... F05D 2220/3219; F01D 11/001; F04D 29/321
See application file for complete search history.

(56) References Cited

U.S. PATENT DOCUMENTS 2,994,508 A * 8/1961 Howald .................. F01D 9/042
                                                415/190
3,706,509 A * 12/1972 Britt .......................... F01D 5/06
                                                416/198 A
(Continued)

FOREIGN PATENT DOCUMENTS

EP      3244007 A1 * 11/2017 ............. F01D 5/082
FR      3041685 B1    10/2017
(Continued)

*Primary Examiner* — Courtney D Heinle
*Assistant Examiner* — Wesley Le Fisher
(74) *Attorney, Agent, or Firm* — Dinsmore & Shohl LLP

(57) ABSTRACT

Structures for reducing forward loads in compressors are described. A compressor includes inner and outer circumferential support structures. The inner circumferential support structure includes an aft-most and forward spacer arms. The compressor also includes two stages, each including a vane having a root positioned at the outer circumferential support structure and a tip positioned radially inward from the root, and a rotor extending radially from the spacer arm adjacent to the vane. An intersection of the rotors and spacer arms defines centrally located points. An arrangement of a first line extending through the points forms an angle with a second line parallel to a longitudinal centerline and extending through the tips of the vanes. The angle is greater than 0° and less than or equal to 45°.

14 Claims, 12 Drawing Sheets

(51) Int. Cl.
    *F02K 3/06*         (2006.01)
    *F04D 19/02*       (2006.01)
    *F04D 29/08*       (2006.01)
    *F04D 29/32*       (2006.01)

(52) U.S. Cl.
    CPC ......... *F04D 29/083* (2013.01); *F04D 29/321* (2013.01); *F04D 29/542* (2013.01); *F02K 3/06* (2013.01); *F05D 2220/3219* (2013.01); *F05D 2240/125* (2013.01); *F05D 2240/55* (2013.01)

(56)             References Cited

U.S. PATENT DOCUMENTS

| | | | |
|---|---|---|---|
| 4,644,746 A | | 2/1987 | Hartman |
| 5,281,087 A | | 1/1994 | Hines |
| 5,378,110 A | | 1/1995 | Ress, Jr. |
| 5,380,155 A | * | 1/1995 | Varsik .................. F01D 11/001 |
| | | | 415/209.3 |
| 5,581,996 A | * | 12/1996 | Koch ...................... F02C 7/185 |
| | | | 60/785 |
| 5,794,432 A | * | 8/1998 | Dunbar .................. F04D 27/02 |
| | | | 60/226.1 |
| 6,250,878 B1 | * | 6/2001 | Wesling .................. F01D 5/026 |
| | | | 415/115 |
| 6,267,553 B1 | | 7/2001 | Burge |
| 8,517,687 B2 | | 8/2013 | Benjamin et al. |
| 10,077,663 B2 | * | 9/2018 | Malmborg .............. F01D 5/066 |
| 10,227,991 B2 | | 3/2019 | Wilber |
| 10,612,383 B2 | | 4/2020 | Moniz et al. |
| 10,746,098 B2 | | 8/2020 | Turner et al. |
| 10,954,796 B2 | * | 3/2021 | Knortz .................... F01D 5/081 |
| 11,156,097 B2 | * | 10/2021 | Stuart ..................... F01D 25/24 |
| 11,414,994 B2 | * | 8/2022 | Depalma ................. F02K 3/072 |
| 11,802,493 B2 | | 10/2023 | Gostomelsky et al. |
| 2012/0275912 A1 | * | 11/2012 | Moniz .................. F04D 29/545 |
| | | | 415/199.5 |
| 2015/0159873 A1 | | 6/2015 | Melton et al. |
| 2016/0208818 A1 | * | 7/2016 | Brilliant ............... F04D 25/045 |
| 2021/0047930 A1 | * | 2/2021 | Depalma ............... F02K 3/072 |

FOREIGN PATENT DOCUMENTS

| | | |
|---|---|---|
| GB | 1210113 A | 10/1970 |
| WO | 2020229069 A1 | 11/2020 |

* cited by examiner

FORWARD LOAD REDUCTION STRUCTURES FOR AFT-MOST STAGES OF HIGH PRESSURE COMPRESSORS

CROSS-REFERENCE TO RELATED APPLICATION

This application claims priority to, and is a continuation of, U.S. patent application Ser. No. 18/142,745, filed May 3, 2023, the entire contents of which are hereby incorporated herein by reference.

FIELD

The present disclosure relates to gas turbine engines, and more specifically, to features of a compressor portion of a gas turbine engine.

BACKGROUND

A gas turbine engine for commercial aircraft typically includes a fan and a turbomachine. The turbomachine, which is commonly referred to as the core, generally includes a compressor section, a combustion section, and a turbine section in serial flow arrangement. The compressor section compresses air that is channeled to the combustion section where it is mixed with fuel. The mixture is then ignited for generating hot combustion gases. The combustion gases are channeled to the turbine section which extracts energy from the combustion gases for powering the compressor section, as well as for producing work, such as for propulsion of an aircraft in flight, or for powering a machine such as an electrical generator.

The air that is compressed by the compressor section can be compressed and directed based on a particular design of components within the compressor section. The characteristics and direction of air flow can directly affect efficiency and/or performance of the gas turbine engine.

BRIEF DESCRIPTION OF THE DRAWINGS

A full and enabling disclosure of the presently described technology directed to one of ordinary skill in the art, is set forth in the specification, which makes reference to the appended figures, in which.

DETAILED DESCRIPTION

Figure 1:
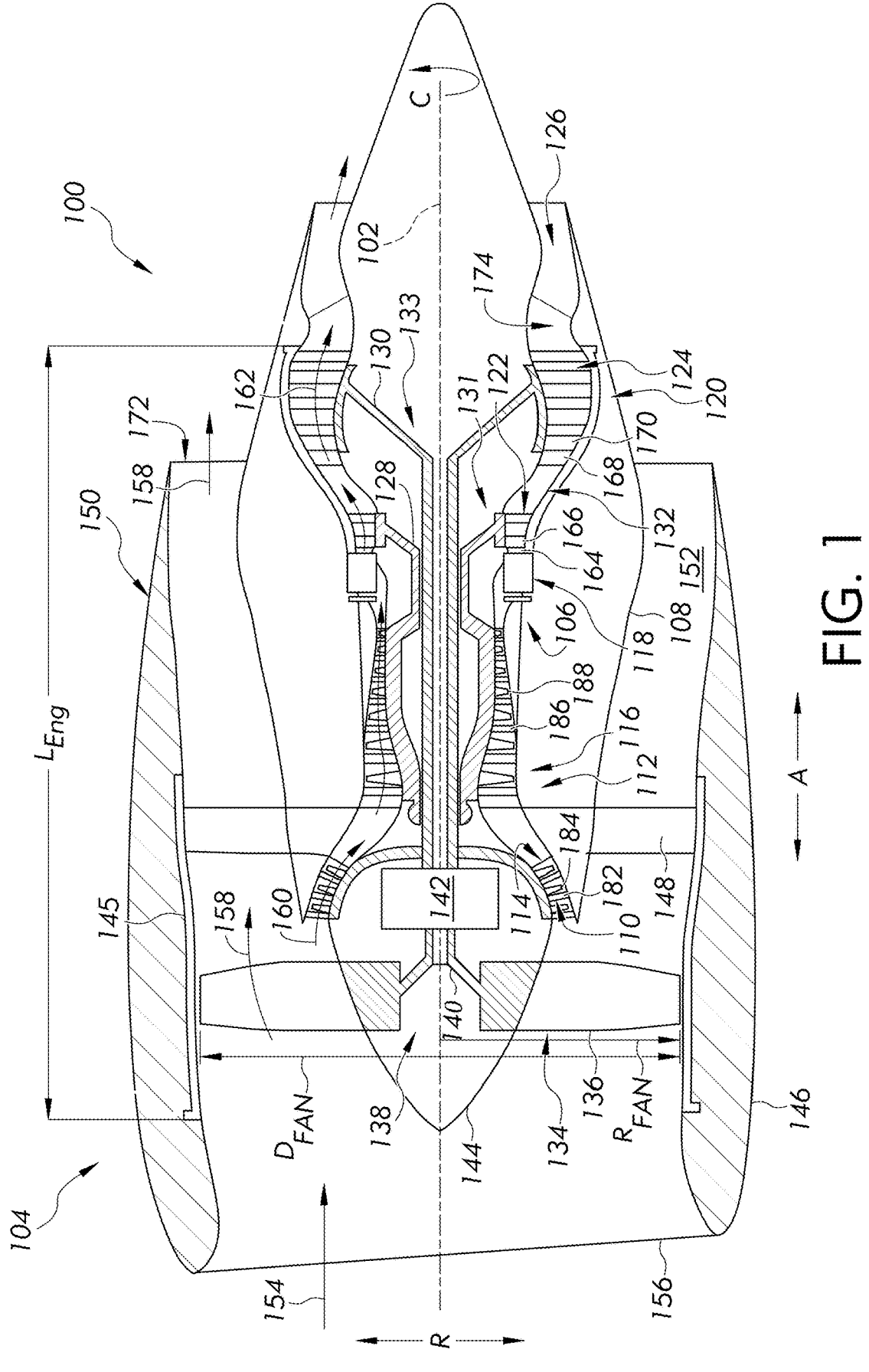
FIG. 1 depicts a cross-sectional view of a gas turbine engine according to one or more aspects described and illustrated herein.

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

The terms "coupled," "fixed," "attached to," and the like refer to both direct coupling, fixing, or attaching, as well as indirect coupling, fixing, or attaching through one or more intermediate components or features, unless otherwise specified herein.

The singular forms "a", "an", and "the" include plural references unless the context clearly dictates otherwise.

The term "at least one of" in the context of, e.g., "at least one of A, B, and C" refers only A, only B, only C, or any combination of A, B, and C.

The terms "forward" and "aft" refer to relative positions within a gas turbine engine, pump, or vehicle, and refer to the normal operational attitude of the gas turbine engine, pump, or vehicle. For example, with regard to a gas turbine engine, forward refers to a position closer to an engine inlet and aft refers to a position closer to an engine nozzle or exhaust.

The terms "upstream" and "downstream" refer to the relative direction with respect to a flow in a pathway. For example, with respect to a fluid flow, "upstream" refers to the direction from which the fluid flows, and "downstream" refers to the direction toward which the fluid flows.

As used in this application, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween.

As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a ten percent margin.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

Engine designers continue to push for more fuel efficient, higher thrust, and quieter turbofan engines that produce less carbon dioxide emissions. Achieving such desired performance goals may consequently increase the thrust loads acting on particular engine components, such as, for example, the ball (thrust) bearings of a high pressure (HP) spool. Minimizing such loads presents certain challenges, including deterioration of certain components and reduced lifespan of certain components.

The inventors of the present disclosure developed architectures for turbofan engines, specifically the compressor portion thereof. Particularly, the inventors proceeded in the manner of designing turbofan engines with given dimensional characteristics in the compressor portion; redesigning the compressor portion to achieve particular characteristics with respect to reducing the thrust loads acting on the HP ball (thrust) bearings, improving the rotor life capability and hence providing higher compressor discharge temperatures (T3) and pressures (P3), reducing the overall engine weight, improving dynamics, and improving compressor load path stiffness for aft regions thereof; and rechecking the thrust loads, exit temperatures, and load path stiffness that resulted from the redesigned compressor during the design of several different types of turbofan engines, including the turbofan engine described below with reference to FIG. 1.

During the course of this practice of studying/evaluating various compressor characteristics, and dimensional characteristics of compressor components considered feasible for best satisfying mission requirements, the inventors unexpectedly discovered that a certain relationship exists between cavity height, vane height, and flowpath hub radius in the aft stages of the compressor, and the flow of air at the exit stages of the compressor. This relationship is captured by a forward load reduction, which represents an indicator of an amount of load acting on the HP spool thrust bearings due to the introduction of a diverging load path with respect to the flowpath hub for the aft stages of the compressor.

Referring now to the drawings, FIG. 1 provides a schematic cross-sectional view of a turbofan engine 100 according to an example embodiment of the present disclosure. For the depicted embodiment of FIG. 1, the turbofan engine 100 is an aeronautical, high-bypass turbofan engine configured mountable to an aircraft, such as, for example, in an underwing configuration. As shown, the turbofan engine 100 defines an axial direction A, a radial direction R, and a circumferential direction C. The axial direction A extends parallel to or coaxial with a longitudinal centerline 102 defined by the turbofan engine 100.

The turbofan engine 100 includes a fan section 104 and a core turbine engine 106 disposed downstream of the fan section 104. The core turbine engine 106 includes an engine cowl 108 that defines an annular core inlet 110. The engine cowl 108 encases, in a serial flow relationship, a compressor section 112 including a first booster (e.g., an LP compressor 114) and a second booster (e.g., an HP compressor 116), a combustion section 118, a turbine section 120 including a first turbine (e.g., an HP turbine 122) and a second turbine (e.g., an LP turbine 124), and an exhaust section 126. The compressor section 112, combustion section 118, turbine section 120, and exhaust section 126 together define a core air flowpath 132 through the core turbine engine 106.

An HP shaft 128 drivingly connects the HP turbine 122 to the HP compressor 116. An LP shaft 130 drivingly connects the LP turbine 124 to the LP compressor 114. The HP shaft 128, the rotating components of the HP compressor 116 that are mechanically coupled with the HP shaft 128, and the rotating components of the HP turbine 122 that are mechanically coupled with the HP shaft 128 collectively form a high pressure spool, or HP spool 131. The LP shaft 130, the rotating components of the LP compressor 114 that are mechanically coupled with the LP shaft 130, and the rotating components of the LP turbine 124 that are mechanically coupled with the LP shaft 130 collectively form a low pressure spool, or LP spool 133.

The fan section 104 includes a fan assembly 138 having a fan 134 mechanically coupled with a fan rotor 140. The fan 134 has a plurality of fan blades 136 circumferentially-spaced apart from one another. As depicted, the fan blades 136 extend outward from the fan rotor 140 along the radial direction R. A power gearbox 142 mechanically couples the LP spool 133 and the fan rotor 140. The power gearbox 142 may also be called a main gearbox. The power gearbox 142 includes a plurality of gears for stepping down the rotational speed of the LP shaft 130 to provide a more efficient rotational fan speed of the fan 134. In other example embodiments, the fan blades 136 of the fan 134 can be mechanically coupled with a suitable actuation member configured to pitch the fan blades 136 about respective pitch axes, such as, for example, in unison. In some alternative embodiments, the turbofan engine 100 does not include the power gearbox 142. In such alternative embodiments, the fan 134 can be directly mechanically coupled with the LP shaft 130, such as, for example, in a direct drive configuration.

Referring still to FIG. 1, the fan rotor 140 and hubs of the fan blades 136 are covered by a rotatable spinner 144 aerodynamically contoured to promote an airflow through the plurality of fan blades 136. Additionally, the fan section 104 includes an annular fan casing 145 and an outer nacelle 146 connected to the fan casing 145. The fan casing 145 and the outer nacelle 146 both circumferentially surround the fan 134 and/or at least a portion of the core turbine engine 106. The fan casing 145 and the outer nacelle 146 are supported relative to the core turbine engine 106 by a plurality of circumferentially-spaced outlet guide vanes 148. A downstream section 150 of the nacelle 146 extends over an outer portion of the core turbine engine 106 so as to define a bypass passage 152 therebetween.

During operation of the turbofan engine 100, a volume of air 154 enters the turbofan engine 100 through an associated inlet 156 of the nacelle 146 and/or fan section 104. As the volume of air 154 passes across the fan blades 136, a first portion of air 158 is directed or routed into the bypass passage 152 and a second portion of air 160 is directed or routed into the annular core inlet 110. The pressure of the second portion of air 160 is progressively increased as it flows downstream through the LP compressor 114 and HP compressor 116. Particularly, the LP compressor 114 includes sequential stages of LP compressor stator vanes 182 and LP compressor blades 184 that progressively compress the second portion of air 160. The LP compressor blades 184 are mechanically coupled to the LP shaft 130. Similarly, the HP compressor 116 includes sequential stages of HP compressor vanes 186 and HP compressor blades 188 that progressively compress the second portion of air 160 even further. The HP compressor blades 188 are mechanically coupled to the HP shaft 128. Additional details regarding the various components of the LP compressor 114 and the HP compressor 116 will be described in greater detail hereinbelow. The compressed second portion of air 160 is then discharged from the compressor section 112 into the combustion section 118.

The compressed second portion of air 160 discharged from the compressor section 112 mixes with fuel and is burned within a combustor of the combustion section 118 to provide combustion gases 162. The combustion gases 162 are routed from the combustion section 118 along a hot gas path 174 of the core air flowpath 132 through the HP turbine 122 where a portion of thermal and/or kinetic energy from the combustion gases 162 is extracted via sequential stages of HP turbine stator vanes 164 and HP turbine blades 166. The HP turbine blades 166 are mechanically coupled to the HP shaft 128. Thus, when the HP turbine blades 166 extract energy from the combustion gases 162, the HP shaft 128 rotates, thereby supporting operation of the HP compressor 116. The combustion gases 162 are routed through the LP turbine 124 where a second portion of thermal and kinetic energy is extracted from the combustion gases 162 via sequential stages of LP turbine stator vanes 168 and LP turbine blades 170. The LP turbine blades 170 are coupled to the LP shaft 130. Thus, when the LP turbine blades 170 extract energy from the combustion gases 162, the LP shaft 130 rotates and supports operation of the LP compressor 114, as well as the fan 134 by way of the power gearbox 142.

The combustion gases 162 exit the LP turbine 124 and are exhausted from the core turbine engine 106 through the exhaust section 126 to provide propulsive thrust. Simultaneously, the pressure of the first portion of air 158 is substantially increased as the first portion of air 158 is routed through the bypass passage 152 before the first portion of air 158 is exhausted from a fan nozzle exhaust section 172 of the turbofan engine 100, also providing propulsive thrust.

The HP turbine 122, the LP turbine 124, and the exhaust section 126 at least partially define the hot gas path 174.

It will be appreciated that the turbofan engine 100 depicted in FIG. 1 is provided by way of example, and that in other example embodiments, the turbofan engine 100 has other configurations. Additionally, or alternatively, aspects of the present disclosure may be utilized with other suitable aeronautical turbofan engines, a turboshaft engine, and turboprop engine.

Figure 2A:
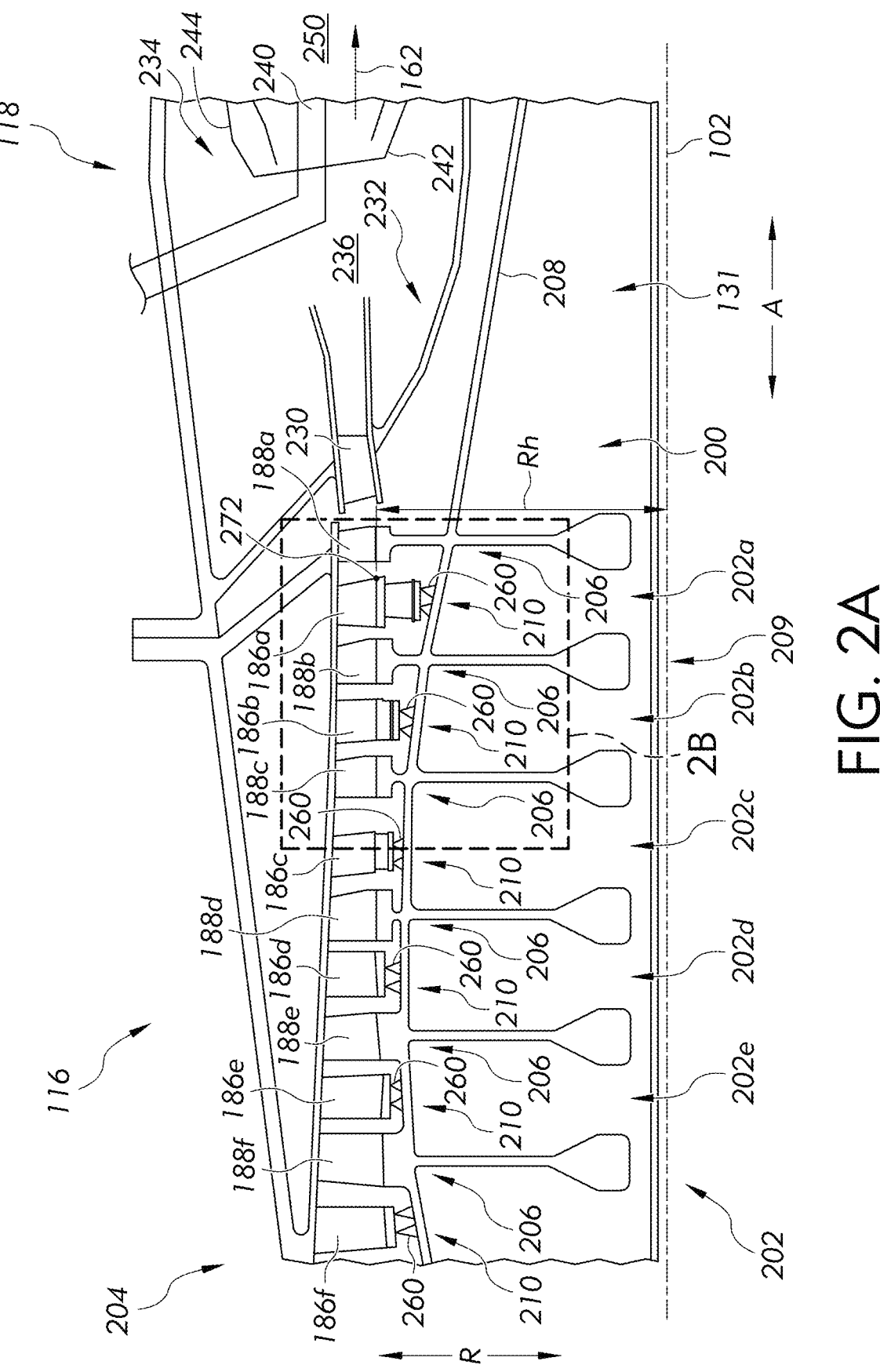
FIG. 2A depicts a plurality of stages of a compressor of the gas turbine engine of FIG. 1 according to one or more aspects described and illustrated herein.

Referring now to FIG. 2A, a schematic, cross-sectional view of a portion of the compressor section 112 and a portion of the combustion section 118 of the turbofan engine 100 of FIG. 1 is provided. More specifically, FIG. 2A depicts an aft end of the HP compressor 116 of the compressor section 112 and a portion of the combustion section 118. However, it should be appreciated that the various components described herein can be included in other compressor sections of the turbofan engine 100, including the LP compressor 114 and/or an intermediate pressure (IP) compressor in 3 spool gas turbine engines.

Figure 2B:
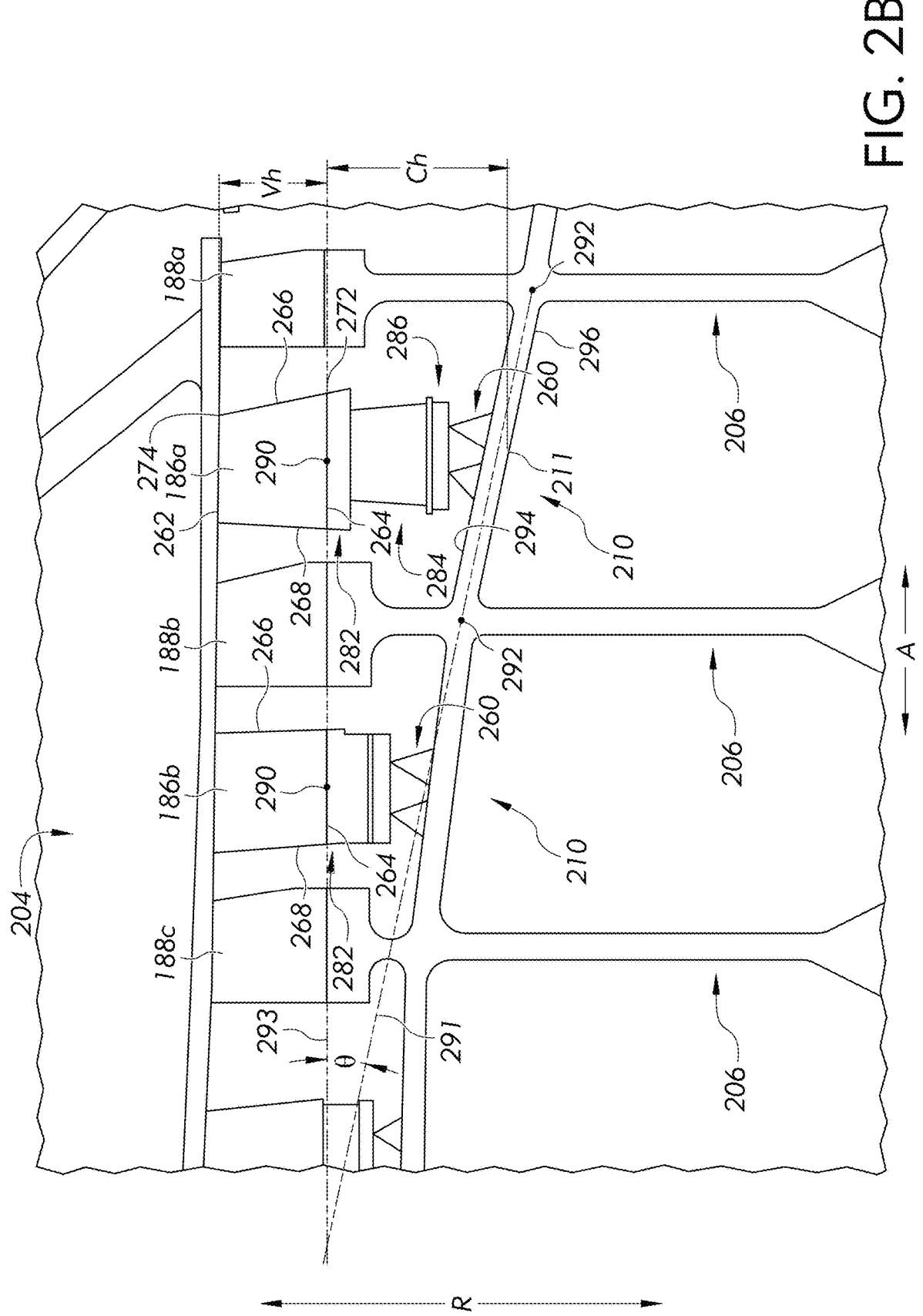
FIG. 2B depicts a detailed view of a portion of the stages of the compressor of FIG. 2A and a portion of a combustion section of the gas turbine engine according to one or more aspects described and illustrated herein.

Referring to FIGS. 1 and 2A-2B, and as noted above, during operation of the turbofan engine 100, an airflow through the core air flowpath 132 of the turbofan engine 100 is sequentially compressed as it flows through the compressor section 112, or more specifically, as it flows through the LP compressor 114 and the HP compressor 116. The compressed air from the compressor section 112 is then provided to the combustion section 118, wherein at least a portion of the compressed air is mixed with fuel and burned to create the combustion gases 162. The combustion gases 162 flow from the combustion section 118 to the turbine section 120, and more specifically, sequentially through the HP turbine 122 and the LP turbine 124, for the embodiment depicted, driving the HP turbine 122 and the LP turbine 124. The HP spool 131 is drivingly coupled to both the HP turbine 122 and the HP compressor 116.

Referring particularly to FIG. 2A, the HP compressor 116 includes a plurality of compressor stages 202a-202e (collectively, compressor stages 202), with each of the compressor stages 202 including, for example, a plurality of the HP compressor blades 188 and a rotor 206. While five compressor stages 202 are depicted in FIG. 2A, the HP compressor 116 includes greater than or fewer than five stages in other embodiments. Each of the various compressor stages 202 is drivingly coupled to the HP spool 131, such that the HP turbine 122 (FIG. 1) may drive the HP compressor 116 through the HP spool 131. Amongst the plurality of compressor stages 202 of HP compressor 116, is an aft-most stage 202a located at an aft end 200 of the HP compressor 116.

The aft-most stage 202a provides compressed air to the combustion section 118. More specifically, for the embodiment depicted in FIG. 2A, the combustion section 118 includes a diffuser 230, an inner combustor casing 232, and a combustor assembly 234. Further, the combustion section 118 defines a diffuser cavity 236, with the diffuser 230 located downstream of the compressor stages 202 of the HP compressor 116 and upstream of the diffuser cavity 236, such that compressed air from the aft-most stage 202a is provided to the diffuser cavity 236 through the diffuser 230. The compressed air within the diffuser cavity 236 is, in turn, provided to the combustor assembly 234, where the compressed air is mixed with fuel and burned to generate the combustion gases 162. As is depicted in FIG. 2A, the combustor assembly 234 generally includes a fuel nozzle 240, an inner liner 242, and an outer liner 244, with the inner liner 242 and the outer liner 244 together forming a combustion chamber 250.

It should be appreciated that the combustor assembly 234 is configured as a suitable assembly for the turbofan engine 100 (FIG. 1). For example, in certain embodiments, the combustor assembly 234 is configured as an annular combustor assembly, a can combustor assembly, or a cannular combustor assembly.

Referring still to FIG. 2A, as previously noted, the HP spool 131 is drivingly connected to the HP compressor 116. For the embodiment depicted, the HP spool 131 generally includes a central spool section including a central spool member 208, which may also be referred to herein as an inner circumferential support structure. The central spool member 208 extends, for the embodiment depicted in FIG. 2A, generally along the axial direction A at a location radially inward of the combustor assembly 234 of the combustion section 118. In addition, the central spool member 208 is coupled to or formed integrally with one or more spacer arms 210 located forward of the central spool member 208. The one or more spacer arms 210, for the embodiment depicted, also extend generally along the axial direction A. Together, the central spool member 208 and the one or more spacer arms 210 may form an inner circumferential support structure 209 of the HP compressor 116.

Still referring to FIG. 2A, the aft-most stage 202a of the HP compressor 116 represents a final stage of the HP compressor 116 when traversing the HP compressor 116 from fore to aft positions in the axial direction A. One or more forward stages 202b-202e located forward of the aft-most stage 202a include, for example, a first forward stage 202b, a second forward stage 202c, a third forward stage 202d, and a fourth forward stage 202e. Each one of the compressor stages 202a-202f includes corresponding ones of the HP compressor vanes 186 and the HP compressor blades 188. That is, the aft-most stage 202a includes an aft-most vane 186a (e.g., a first vane) and a first compressor blade 188a, the first forward stage 202b includes a second vane 186b and a second compressor blade 188b, the second forward stage 202c includes a third vane 186c and a third compressor blade 188c, the third forward stage 202d includes a fourth vane 186d and a fourth compressor blade 188d, and the fourth forward stage 202e includes a fifth vane 186e and a fifth compressor blade 188e, and so forth (e.g., a sixth vane 186f and a sixth compressor blade 188f, etc.).

The HP compressor 116 further includes an outer casing 204, which may also be referred to herein as an outer circumferential support structure. The outer casing 204 may extend generally in the axial direction A radially outward of the inner circumferential support structure 209. In some embodiments, the outer casing 204 and the inner circumferential support structure 209 are positioned around a central axis, such as, for example, the longitudinal centerline 102 of the turbofan engine 100 (FIG. 1). That is, the inner circumferential support structure 209 is positioned radially outward of the longitudinal centerline 102 (FIG. 1), and the outer casing 204 is spaced radially outward of the inner circumferential support structure 209, as depicted in FIG. 2A.

Referring to FIGS. 2A and 2B, the various vanes 186 of the compressor generally extend inwardly a distance in the radial direction R from the outer casing 204. Each one of the various vanes 186 extends from the outer casing 204 at a location that is between adjacent compressor blades 188. For example, the aft-most vane 186a may extend from the outer casing 204 at a location that is between the first compressor blade 188a and the second compressor blade 188b. In addition, the various vanes 186 extend towards the inner circumferential support structure 209, particularly one of the one or more spacer arms 210 thereof. In embodiments, one or more components are disposed between the vanes 186 and the corresponding spacer arms 210, such as, for example, an inner platform 282, a seal support structure 284, a seal structure 286, and/or one or more seal teeth 260, as described in greater detail herein.

Referring particularly to FIG. 2B, each of the vanes 186 (e.g., the aft-most vane 186a, the second vane 186b, etc.) includes a root 262, a tip 264, a leading edge 268, and a trailing edge 266. The root 262 of each vane 186 represents a radially outward extent of the vane 186 at a connection point with the outer casing 204. That is, the root 262 of each vane 186 is the part (e.g., end) of the vane 186 that contacts the outer casing 204. The tip 264 of each vane 186 represents a radially inward extent of the vane 186. That is, the tip 264 of each vane 186 is the part (e.g., end) of the vane that is closest to the corresponding spacer arm 210. The leading edge 268 of each vane 186 represents an edge of the vane 186 that extends from the root 262 to the tip 264 and is a forward-most edge of the vane 186 generally in the axial direction (e.g., an edge that receives fluid flowing through the HP compressor 116, as described herein). The trailing edge 266 of each vane 186 represents an edge of the vane 186 that extends from the root 262 to the tip 264 and is an aft-most edge of the vane 186 generally in the axial direction. As such, the trailing edge 266 and the leading edge 268 are opposite one another. In some embodiments, the trailing edge 266 and the leading edge 268 are parallel or substantially parallel to one another. In other embodiments, the trailing edge 266 and the leading edge 268 are not parallel to one another.

As depicted in FIG. 2B, each of the vanes 186 defines a first point 272 and a second point 274. The first point 272 represents the intersection of the tip 264 of the vane 186 with the trailing edge 266 of the vane 186. The second point 274 represents an intersection of the root 262 of the vane 186 with the trailing edge 266 of the vane 186.

As noted herein, one or more components may be disposed between the tip 264 of each vane 186 and the corresponding spacer arm 210, including, for example, the inner platform 282, the seal support structure 284, the seal structure 286, and/or the one or more seal teeth 260. In embodiments, the inner platform 282, the seal support structure 284, the seal structure 286, and the one or more seal teeth 260 appear in serial order from the tip 264 to the corresponding spacer arm 210, with the inner platform 282, the seal support structure 284, and the seal structure 286 coupled to one another and the tip 264 of each vane 186 and the one or more seal teeth disposed on a radially outer surface 294 of the spacer arm 210.

The inner platform 282 is a component that defines a flow path. That is, fluid (e.g., air) movement through each of the compressor stages 202 (FIG. 2A) occurs via the flow path defined by the inner platform 282. The inner platform 282 is coupled to and extends inward along the radial direction R from the tip 264 of the vane 186. As will be appreciated, the inner platform 282 has a shape and surface features that are not necessarily limited to the shape and surface features disclosed in the examples. For example, the inner platform 282 may be shaped to correspond to a shape of the tip 264 of the vane 186 and/or may be shaped to flare outward in the axial direction A relative to a width of the vane 186 (e.g., a dimension extending from the leading edge 268 to the trailing edge 266 of the vane 186). Each inner platform 282 may be different relative to the other inner platforms 282 in shape, size, and configuration, or may be substantially the same as the other inner platforms 282 in shape, size, and configuration.

The inner platform 282 further defines an area past which air of the core air flowpath 132 (FIG. 1) flows. The specific dimensional aspects of the inner platform 282, as described in greater detail herein, directs the air from the core air flowpath 132 (FIG. 1) in a particular manner. While the flowpath hub is still maintained, an angle of a high-pressure aft cone arm reduces with respect to the longitudinal centerline 102 (FIG. 1), which enables better life for various components.

The seal support structure 284 is generally a component coupled to and disposed inward in the radial direction R of the inner platform 282. The seal support structure supports the seal structure 286 thereon. The seal structure 286 is generally any component that prevents or minimizes fluid leakage from the flow path defined by the inner platform 282. That is, the seal structure 286 functions to maintain fluid flow within the flow path defined by the inner platform 282. In the embodiment depicted in FIG. 2B, the seal structure 286 is an abradable honeycomb seal. That is, the seal structure 286 is a machined component having individual chambers that create a pressure drop to slow leakage and/or disrupt circumferential flow around the HP shaft 128 (FIG. 1). The seal structure 286 forms a seal with the seal teeth 260 that are disposed on the radially outer surface 294 of the spacer arm 210.

It should be appreciated that the seal structure 286 depicted in FIG. 2B is not limited to an abradable honeycomb seal. For example, in other embodiments, the seal structure 286 is a bridge seal, a stick-type seal, a box-type seal, an attached seal ring housing, a foil seal, a brush seal, an advanced aspirating seal, or the like. In some embodiments, the seal structure 286 is selected depending on the size of an inter stage seal (ISS) cavity defined by the spacer arm 210, adjacent rotors 206 and the outer casing 204.

Figure 3A:
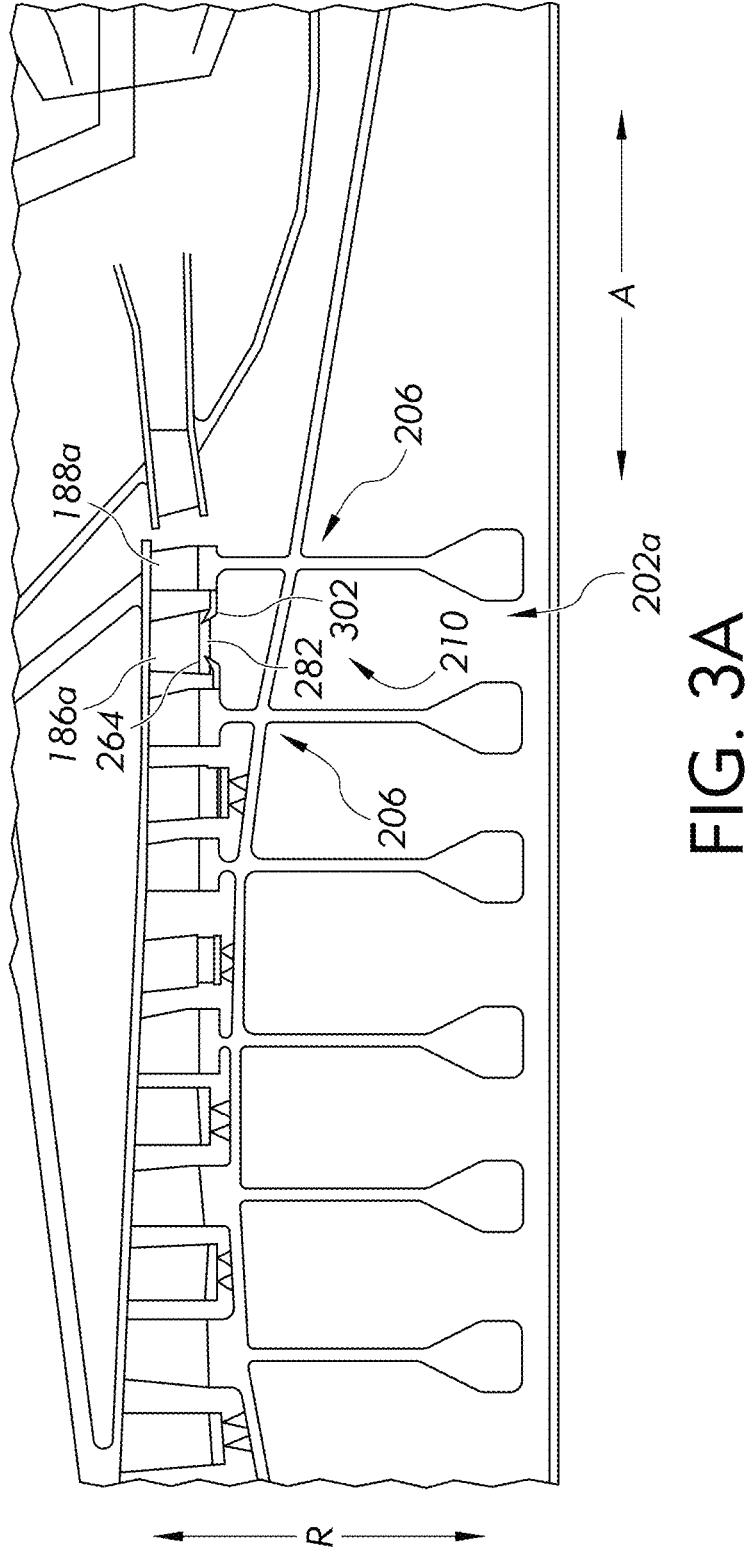
FIG. 3A depicts an aft-most stage of a compressor having a bridge seal according to one or more aspects described and illustrated herein.

Referring now to FIGS. 3A-3D, various illustrative seal structures located within the aft-most stage 202a of the HP compressor 116 are depicted. More specifically, FIG. 3A depicts a bridge seal 302 coupled to the inner platform 282 at a location that is inward in the radial diction R relative to the inner platform 282. That is, the bridge seal 302 extends generally in the axial direction A and is held in place on either end thereof by adjacent rotors 206 such that the bridge seal 302 forms a seal with the inner platform 282 of aft-most vane 186a to maintain fluid flow within the flow path defined by the inner platform 282. As is depicted in FIG. 3A, the bridge seal 302 is positioned a distance from the spacer arm 210 in the radial direction R and does not contact the spacer arm 210. Use of the bridge seal 302 allows for the aft-most vane 186a to provide sealing functionality at a reduced size relative to other seal structures. As a result, the bridge seal 302 also reduces or eliminates windage losses in forward and aft wheelspace cavities. As depicted in FIG. 3A, the aft-most vane 186a includes the inner platform 282 and is abradable. In other embodiments, the bridge seal 302 is formed as a bridge arm connecting the adjacent rotors 206, which allows for the aft-most vane 186a to act as a cantilever vane. In some embodiments, and as depicted in FIG. 3A, use of the bridge seal 302 eliminates the use of seal teeth in the aft-most stage 202a.

Figure 3B:
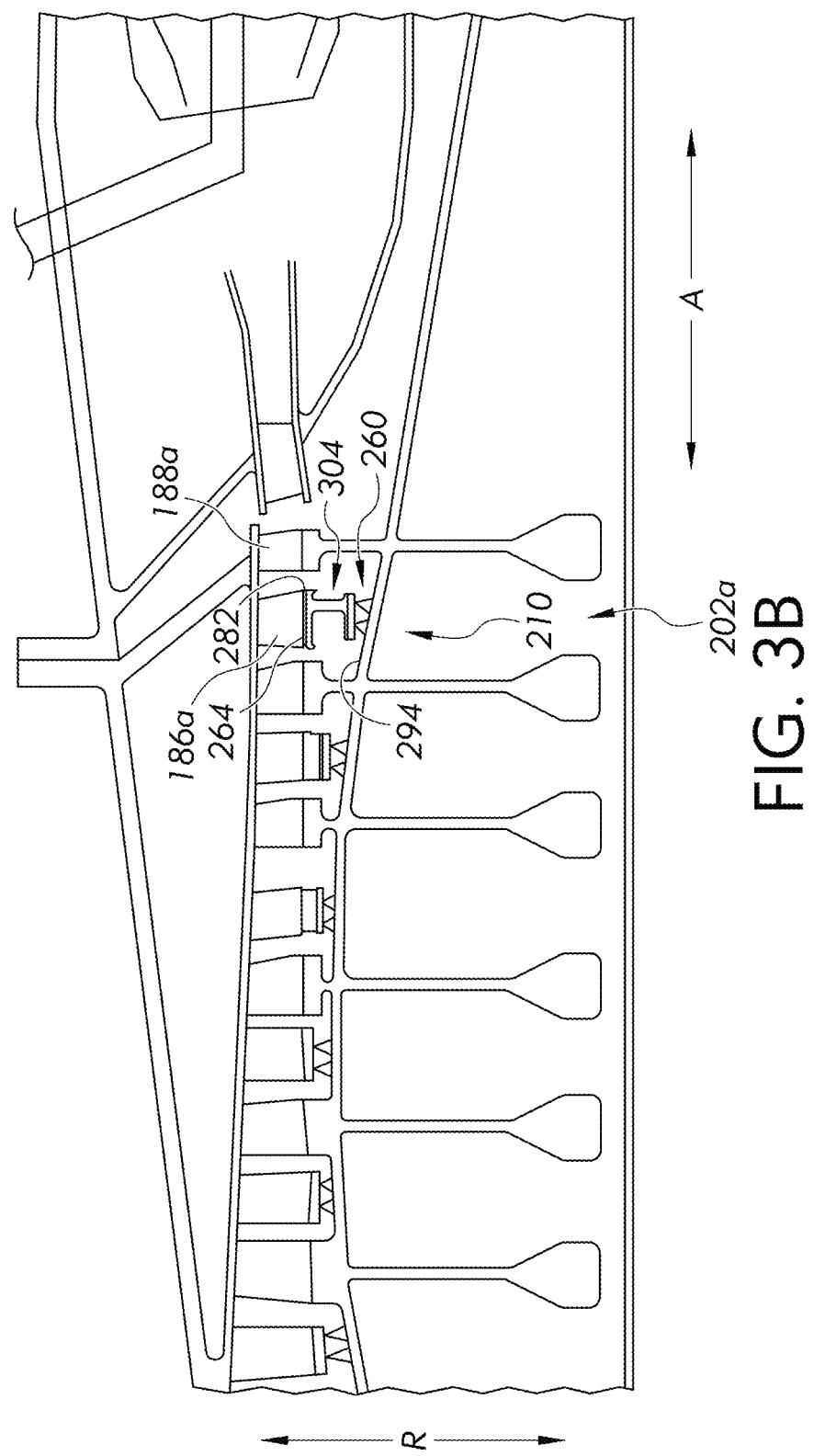
FIG. 3B depicts an aft-most stage of a compressor having a stick-type seal housing according to one or more aspects described and illustrated herein.

Referring now to FIG. 3B, a stick-type seal housing 304 may be implemented between the inner platform 282 and the seal teeth 260. That is, the stick-type seal housing 304 may be coupled to and extend inward along the radial direction R from the inner platform 282 and contact the one or more seal teeth 260 positioned on the radially outer surface 294 of the spacer arm 210 to seal the aft-most vane 186a. For high temperature cycles, a cast vane segment may be utilized. The stick-type seal housing 304 enables an integral casting of vanes to form segments, including a platform and a seal.

Figure 3C:
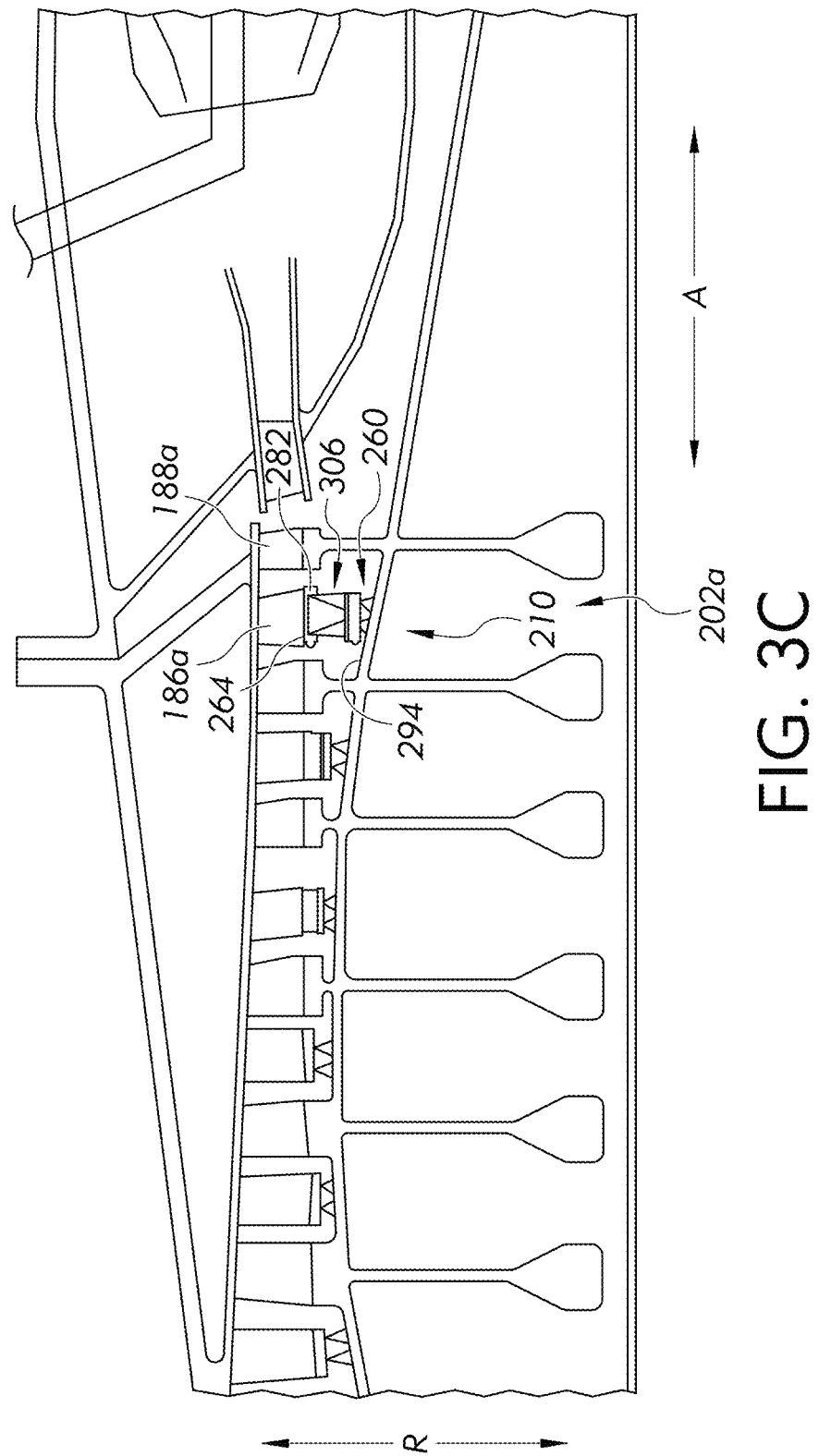
FIG. 3C depicts an aft-most stage of a compressor having a box-type seal housing according to one or more aspects described and illustrated herein.

Referring now to FIG. 3C, a box-type seal housing 306 may be implemented between the inner platform 282 and the one or more seal teeth 260. That is, the box-type seal housing 306 may be coupled to and extend inward along the radial direction R from the inner platform 282 and contact the one or more seal teeth 260 positioned on the radially outer surface 294 of the spacer arm 210 to seal the aft-most vane 186a. Use of such a box structure may be particularly used in embodiments with a high ISS cavity area, as the box structure provides a seal in the cavity with minimal weight impact relative to other sealing structures.

Figure 3D:
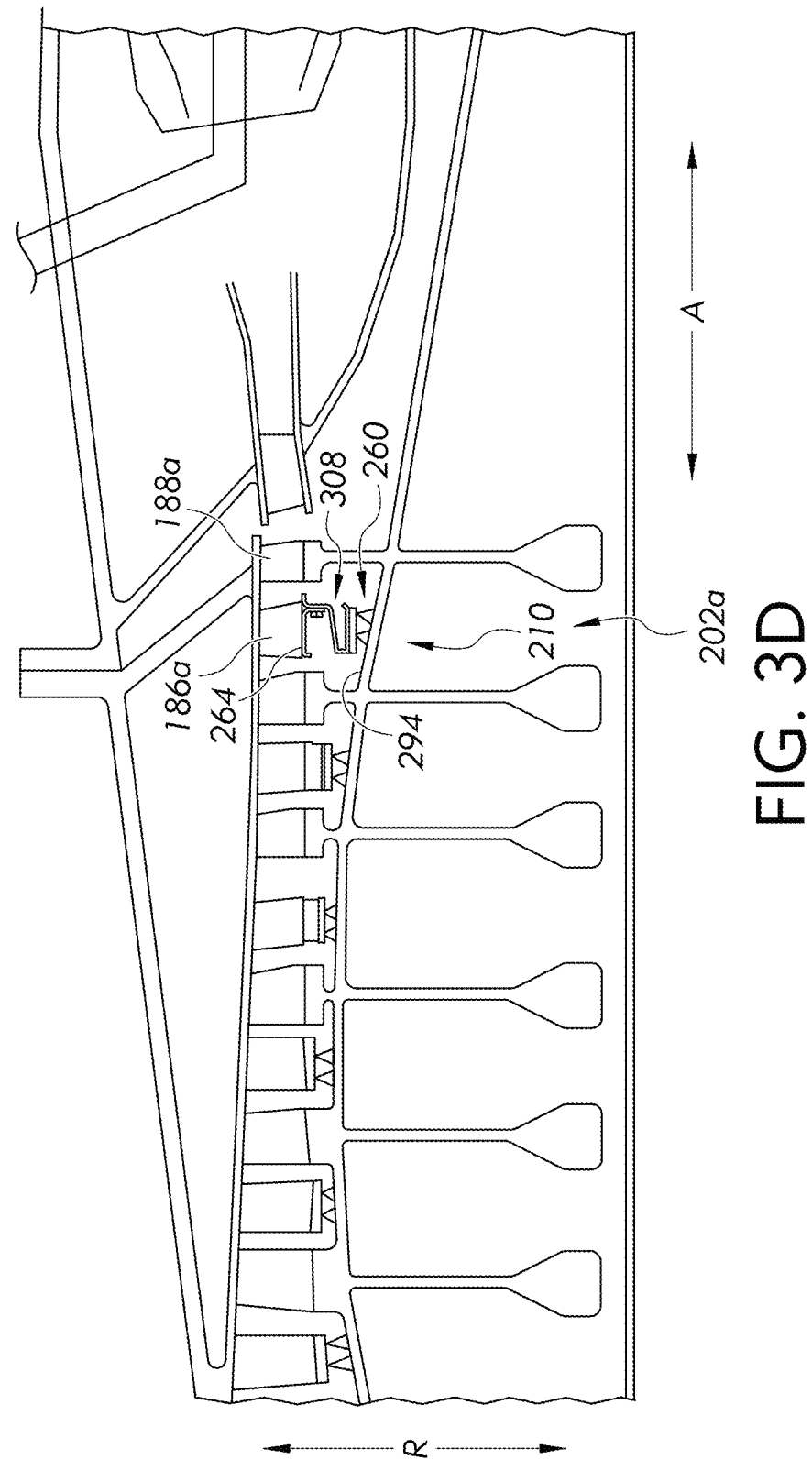
FIG. 3D depicts an aft-most stage of a compressor having an attached seal ring housing according to one or more aspects described and illustrated herein.

Referring now to FIG. 3D, an attached seal ring housing 308 may be implemented between the tip 264 of the aft-most vane 186a and the one or more seal teeth 260. That is, the attached seal ring housing 308 may be coupled to and extend inward along the radial direction R from the tip 264 of the aft-most vane 186a and contact the one or more seal teeth 260 positioned on the radially outer surface 294 of the spacer arm 210 to seal the aft-most vane 186a. The attached seal ring housing 308 may be used in lieu of the platform described herein with respect to other sealing structures. The attached seal ring housing 308 may include a seal and shroud that is fixed to the aft-most vane 186a (e.g., riveted to the aft-most vane 186a). Because embodiments utilizing the attached seal ring housing 308 omits the platform described elsewhere herein, the attached seal ring housing 308 may further define the flow path. Use of the attached seal ring housing 308 may improve vane-to-vane circumferential leakage relative to other sealing components.

It should be appreciated that while various seal structures described herein are particularly depicted with respect to the aft-most stage 202a, such seals may also be used in other stages without departing from the scope of the present disclosure.

Referring again to FIGS. 2A and 2B, the spacer arms 210 are generally positioned a distance inward from the outer casing 204 in the radial direction R to define spaces for each of the compressor stages 202, including the vanes 186 and the HP compressor blades 188 thereof. The spacer arm 210 of the aft-most stage 202a defines-points 292 that are centrally located at an intersection of the spacer arm 210 with each rotor 206 bounding the aft-most stage 202a. As will be described in greater detail herein, a first line 291 drawn through both points 292 forms an angle θ with a second line 293 that is parallel to the longitudinal centerline 102 (e.g., in some embodiments, extending through at least one midpoint 290 located equidistant from the trailing edge 266 and the leading edge 268 at the tip 264 of a vane 186). The angle θ may be referred to as a spacer angle. It should be understood that since each spacer arm 210 may have a different slope, each compressor stage 202 may have a corresponding spacer angle that is different from a spacer angle of an adjacent or nearby spacer arm. As such, the angle θ depicted in FIG. 2B is referred to as the spacer angle for the aft-most stage 202a.

As previously noted herein, the spacer arms 210 includes the radially outer surface 294 and the radially inner surface 296. The radially inner surface 296 is opposite the radially outer surface 294. The radially outer surface 294 of the spacer arms 210 generally faces the vanes 186 and, in some embodiments, supports the one or more seal teeth 260 coupled thereto. The spacer arms 210 generally define a thickness in the radial direction R between the radially outer surface 294 and the radially inner surface 296. In addition, the spacer arms 210 define a midpoint 211 on the radially inner surface 296 that is located equidistant between adjacent points 292, as depicted in FIG. 2B.

As will be described in further detail herein, a first radial distance Ch is defined by a distance in the radial direction R between the first point 272 and the midpoint 211 on the radially inner surface 296 of the corresponding spacer arm 210. That is, the first radial distance Ch represents a distance that includes all of the components disposed between the tip 264 of the vane 186 and the corresponding spacer arm 210, including, in some examples, the inner platform 282, the seal support structure 284, the seal structure 286, the one or more seal teeth 260, and the thickness of the spacer arm 210. This first radial distance Ch may also be referred to as a cavity height. As will also be described in further detail herein, a second radial distance Vh is defined by a distance in the radial direction R between the first point 272 and the second point 274. The second radial distance Vh also represents a height of the vane 186 and may be referred to as a vane height. Further, with reference to FIG. 2A, a third radial distance Rh is defined by a distance in the radial direction R between the first point 272 and the longitudinal centerline 102 of the engine.

Figure 4A:
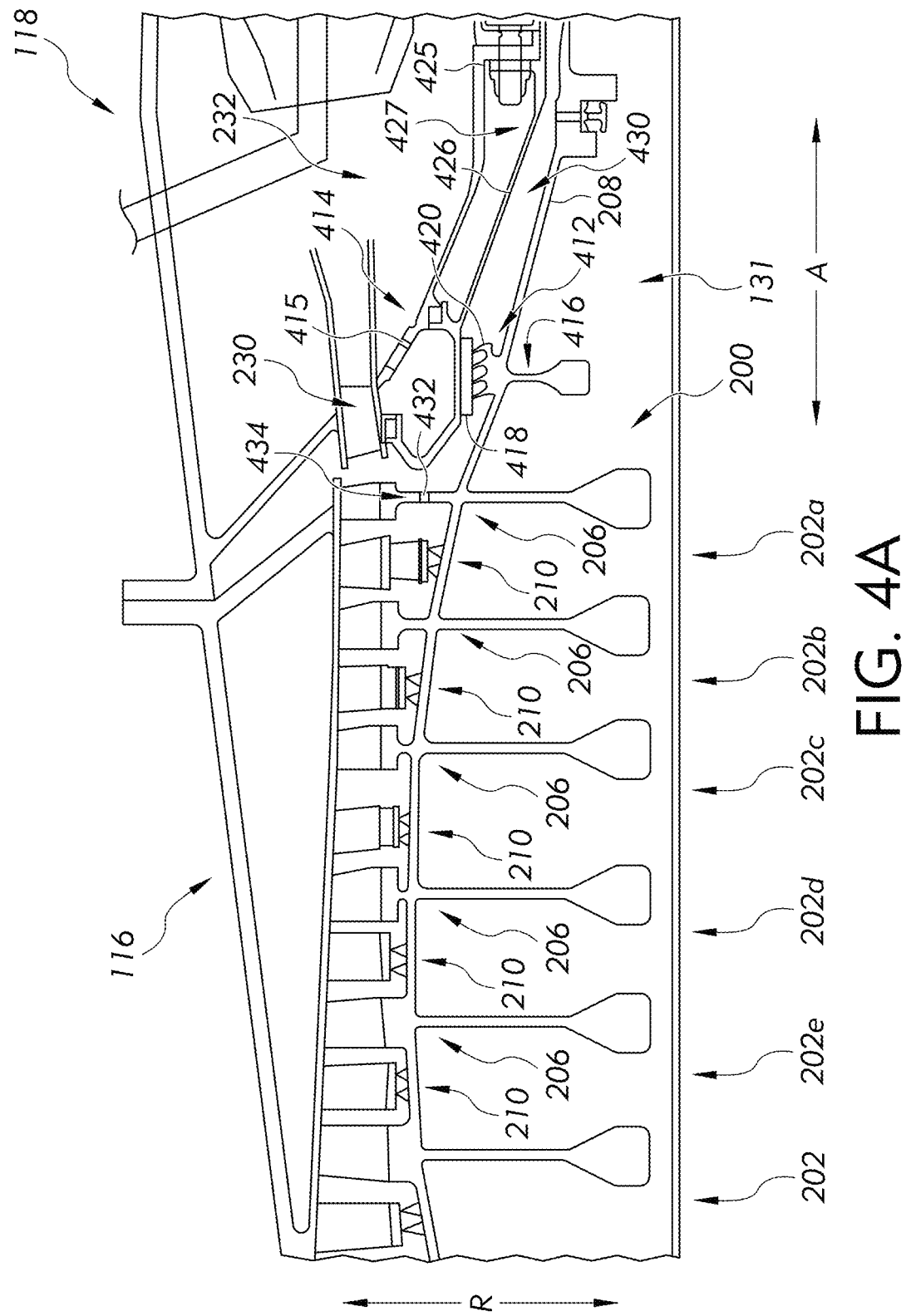
FIG. 4A depicts an aft stage of a compressor having a particular radius that reduces a combustor discharge pressure cavity volume according to one or more aspects described and illustrated herein.
Figure 4B:
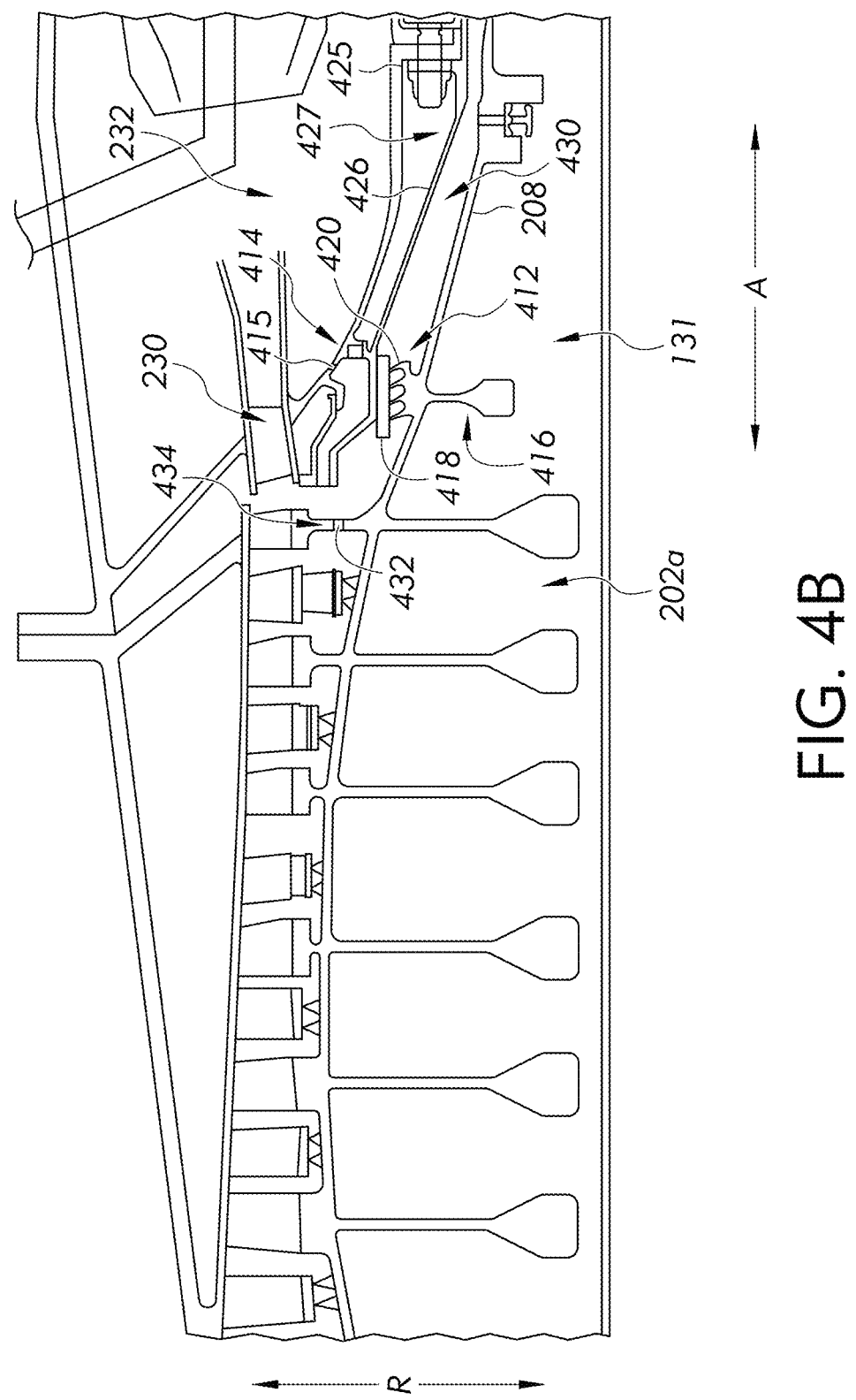
FIG. 4B depicts an aft stage of a compressor having a blisk in lieu of a circumferential dovetail bladed disk according to one or more aspects described and illustrated herein.

Referring now to FIGS. 4A-4B, a stator delivery system that enables cooled cooling air passage to an area forward of the rotor 206 of the aft-most stage 202*a* via hole passages present on the rotor 206 above a rotor rim is depicted. The inner combustor casing 232 of the combustion section 118 also forms in part a compressor discharge pressure seal 412, such that the HP spool 131 forms the compressor discharge pressure seal 412 with the inner combustor casing 232 of the combustion section 118. As is depicted in FIGS. 4A and 4B, the inner combustor casing 232 forms a stator portion 414 of the compressor discharge pressure seal 412 and the HP spool 131 forms a rotor portion 416 of the compressor discharge pressure seal 412 (the rotor portion 416 being rotatable relative to the stator portion 414). The stator portion 414 generally includes a seal pad 418 and the rotor portion 416 generally includes a plurality of seal teeth 420 configured to form a seal with the seal pad 418.

The compressor discharge pressure seal 412 depicted in FIGS. 4A-4B is a labyrinth seal. However, it should be appreciated that in other illustrative embodiments, the compressor discharge pressure seal 412 can have another suitable configuration. For example, in alternative illustrative embodiments, the compressor discharge pressure seal 412 is configured as a brush seal, an aspirating seal, or the like.

Referring still to FIGS. 4A-4B, the inner combustor casing 232 generally includes a structural portion 425 and a seal flow separator 426. The seal flow separator 426 extends from the structural portion 425 of the inner combustor casing 232 to define in part an air flow path 430 with the HP spool 131, and more specifically with the central spool member 208. Notably, the inner combustor casing 232 further defines in part an air cavity 427 positioned inward of the structural portion 425 along the radial direction R, and the seal flow separator 426 separates the compressor discharge pressure seal 412 from the air cavity 427.

Referring particularly to FIG. 4B, which depicts an aftmost stage blisk, the turbofan engine 100 (FIG. 1) generally defines at least in part the air flow path 430. The air flow path 430 is positioned at least in part between the HP spool 131 and the inner combustor casing 232, and, more specifically, for the embodiment shown, is defined at least in part by the inner combustor casing 232 and the seal flow separator 426.

Further, for the embodiment depicted in FIG. 4B, the air flow path 430 further extends past, or through, the compressor discharge pressure seal 412 and is in fluid communication with the core air flowpath 132 of the turbofan engine 100. More specifically, in the embodiment depicted, the air flow path 430 is in fluid communication with the core air flowpath 132 at the HP compressor 116. More specifically, still, in the embodiment depicted, the air flow path 430 is in fluid communication with the core air flowpath 132 at a location downstream of the aft-most stage 202*a* and upstream of the diffuser 230.

As noted, the embodiments of FIGS. 4A-4B introduce holes 415 in the stator portion 414 to allow for cooling air. Cooling air is introduced into the inner combustor casing 232 through conduit from an external location (not depicted). The holes 415 in the stator portion 414 locate air into the cavity above (e.g., outward in the radial direction R) the seal pad 418 and direct the air into the cavity directly aft of the aft-most stage rotor 206. In FIG. 4B, the cooling air is directed into the cavity directly aft of the aft-most stage rotor 206 via an inducer in the seal flow separator 426. In other embodiments, the cooling air can also be directed into the cavity directly aft of the aft-most stage rotor 206 via hole features 432 in a pedestal portion 434 of the aft-most stage rotor 206.

The aft-most stage 202*a* depicted in FIG. 4B includes a blisk. That is, the aft most-stage includes a disk with integral/welded blades instead of other forms of blade to disk attachment, such as axial or circumferential dovetail, bolted, or pinned. These are different combinations/types of blade attachments that can be used interchangeably at the aft-most stage 202*a* or any other stage of the HP compressor. Use of a blisk represents an assembly having the lightest weight due to absence of attachment features like dovetails/pins.

In some embodiments, the spacer arm 210 is a single, continuous structure formed as part of the inner circumferential support structure 209 (FIG. 2A). However, in other embodiments, the spacer arm 210 includes more than one component to provide additional benefits, such as, for example, higher torque transfer, use of lower spacer arm radii, and/or length reduction. For example, as depicted in FIGS. 5A and 5B, the spacer arm 210 may include a first portion 210*a* and a second portion 210*b*.

Figure 5A:
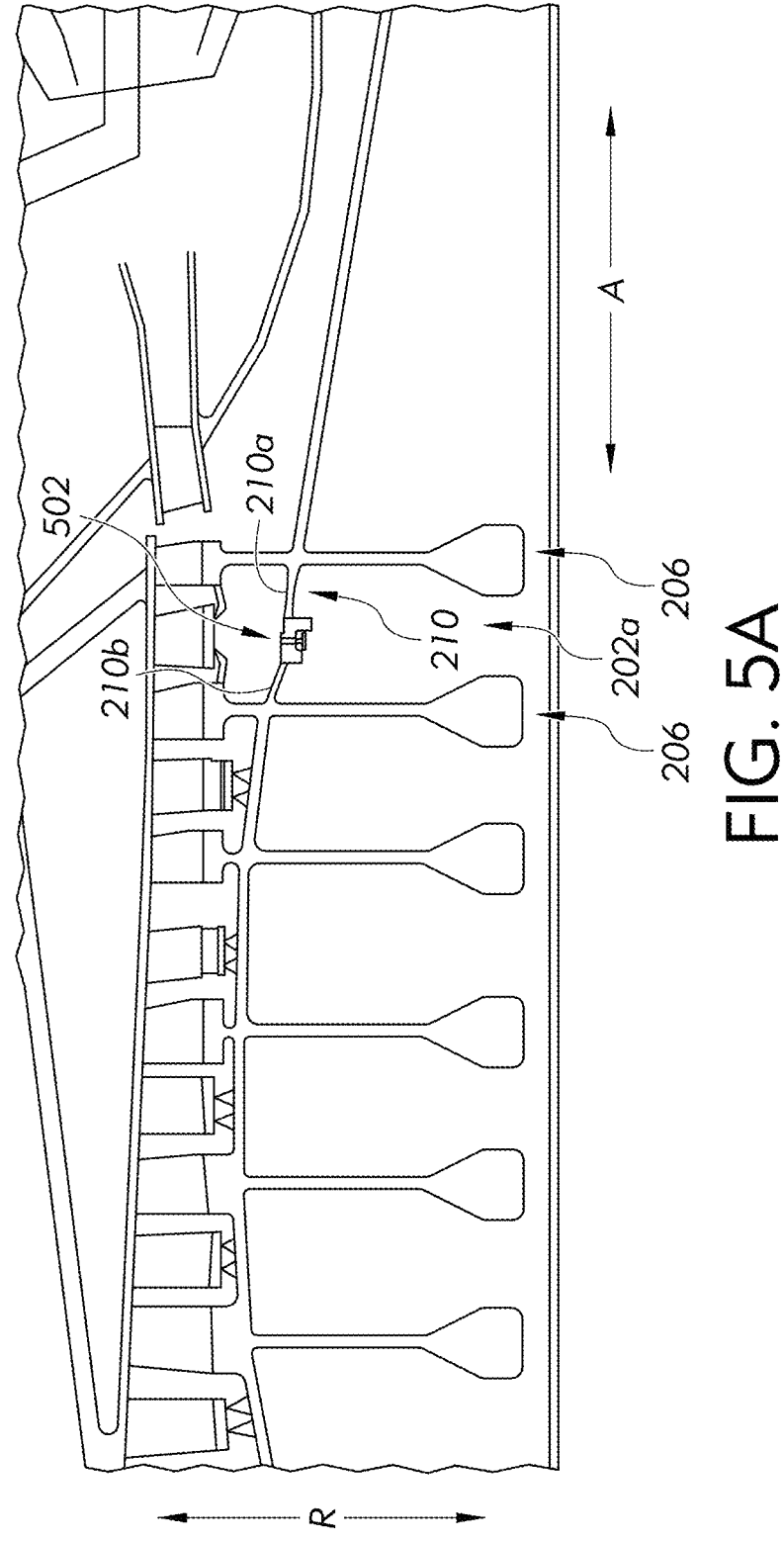
FIG. 5A depicts a curvic coupling disposed between stages of a compressor according to one or more aspects described and illustrated herein.

As particularly depicted in FIG. 5A, the first portion 210*a* and the second portion 210*b* of the spacer arm 210 may be joined together via a curvic coupling 502 that extends in the axial direction A between the first portion 210*a* and the second portion 210*b*. The curvic coupling 502 is generally a ring of face splines or radial teeth disposed on the first portion 210*a* of the spacer arm 210 that interlock with a corresponding ring of space splines or radial teeth disposed the second portion 210*b* of the spacer arm 210 to couple the first portion 210*a* and the second portion 210*b* together. Use of the curvic coupling 502 may allow for higher torque transfer capability of the spacer arm 210 relative to spacer arms that do not incorporate a curvic coupling.

Figure 5B:
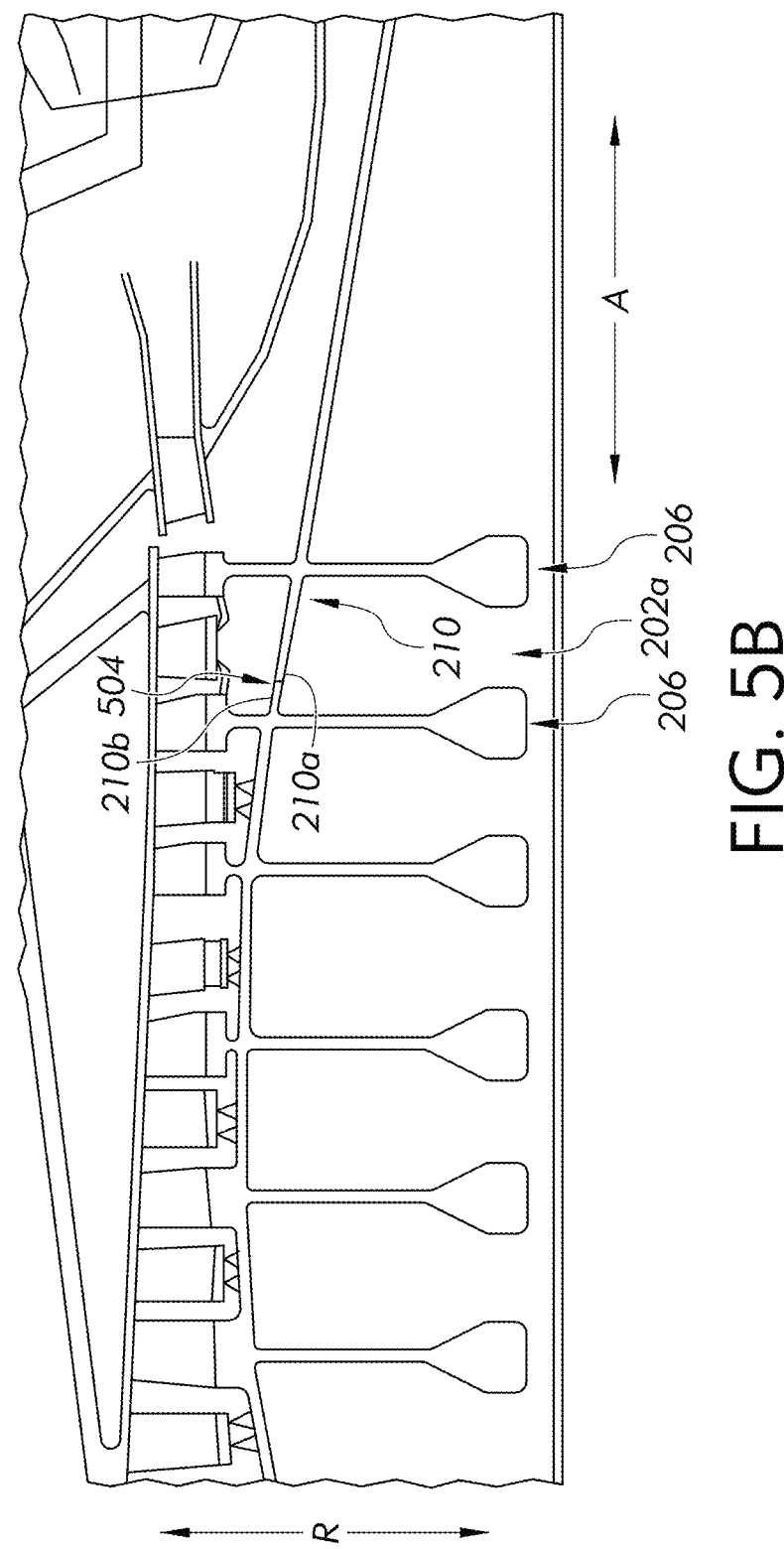
FIG. 5B depicts a friction joint disposed between stages of a compressor according to one or more aspects described and illustrated herein.

As particularly depicted in FIG. 5B, the first portion 210*a* and the second portion 210*b* of the spacer arm 210 may be joined together via a welded joint 504. The welded joint 504 is generally a point where the first portion 210*a* and the second portion 210*b* contact one another and are held together via welds. Use of the welded joint 504 may allow for lower torque transfer capability of the spacer arm 210 relative to spacer arms that do not incorporate a welded joint.

While not depicted in FIGS. 5A and 5B, the first portion 210a and the second portion 210b of the spacer arm 210 are coupled via a weld joint in some embodiments. Use of a weld joint may realize a machining benefit in that a radius of the spacer arm can be reduced, which enables easier tool access between adjacent rotors 206 in the axial direction A (e.g., for the purposes of cleaning or the like).

As alluded to earlier, the inventors discovered, unexpectedly during the course of engine design, that a relationship exists between the relative dimensions of components within the aft-most stage of the HP compressor 116 in directing the HPC load path, while at the same time maintaining the flowpath hub per aero requirements. In addition, the inventors discovered that the angle of the high-pressure aft cone arm (the spacer angle θ described herein) is reduced with respect to the engine center line relative to conventionally shaped components and enabling a longer life for the component. The inventors further discovered that, by tuning the relative dimensions of components of the aft-most stages of the HP compressor 116, the forward thrust loads acting on the HP spool thrust bearing could be reduced, a higher compressor discharge temperature T3 can be enabled with existing materials, overall engine weight could be reduced, structural dynamics associated with operation of the high speed (HP) shaft are improved, and at least a 15% improvement in the compressor load path stiffness in the aft regions thereof were observed. As a result, an improvement in fuel burn was also realized.

The higher compressor discharge temperature T3 realized by the inventors is directly relatable to the improvements in compressor characteristics and performance. Lowering and smoothing of the rotor mechanical load path helps solve issues relating to weight, life, and dynamics. Lowering and smoothing of the load path also enables performance improvements in the form of higher operating temperatures. While larger wheelspace cavities cause some performance loss due to windage, the losses are more than offset by the benefits that are realized.

Figure 6A:
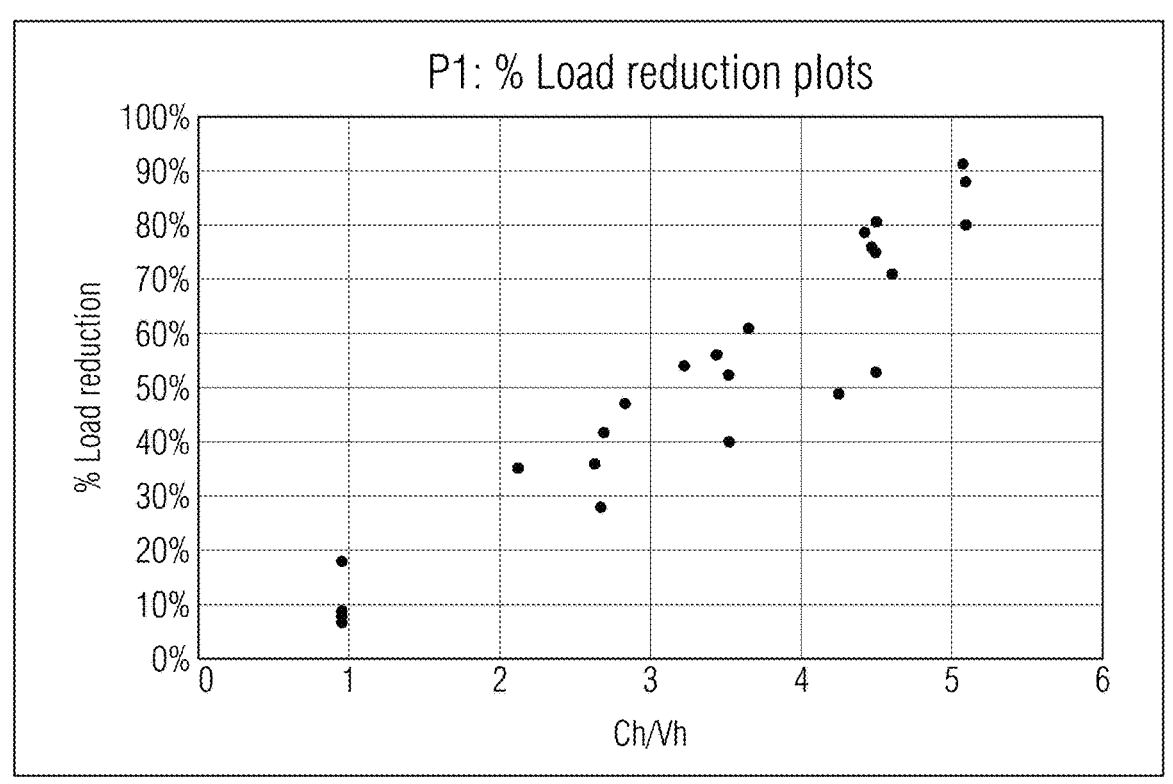
FIG. 6A graphically depicts a resulting percentage of load reduction on a high pressure (HP) spool thrust bearing when a vane of the aft-most stage of the compressor of FIGS. 2A-2B has particular dimensional characteristics according to one or more aspects described and illustrated herein.
Figure 6B:
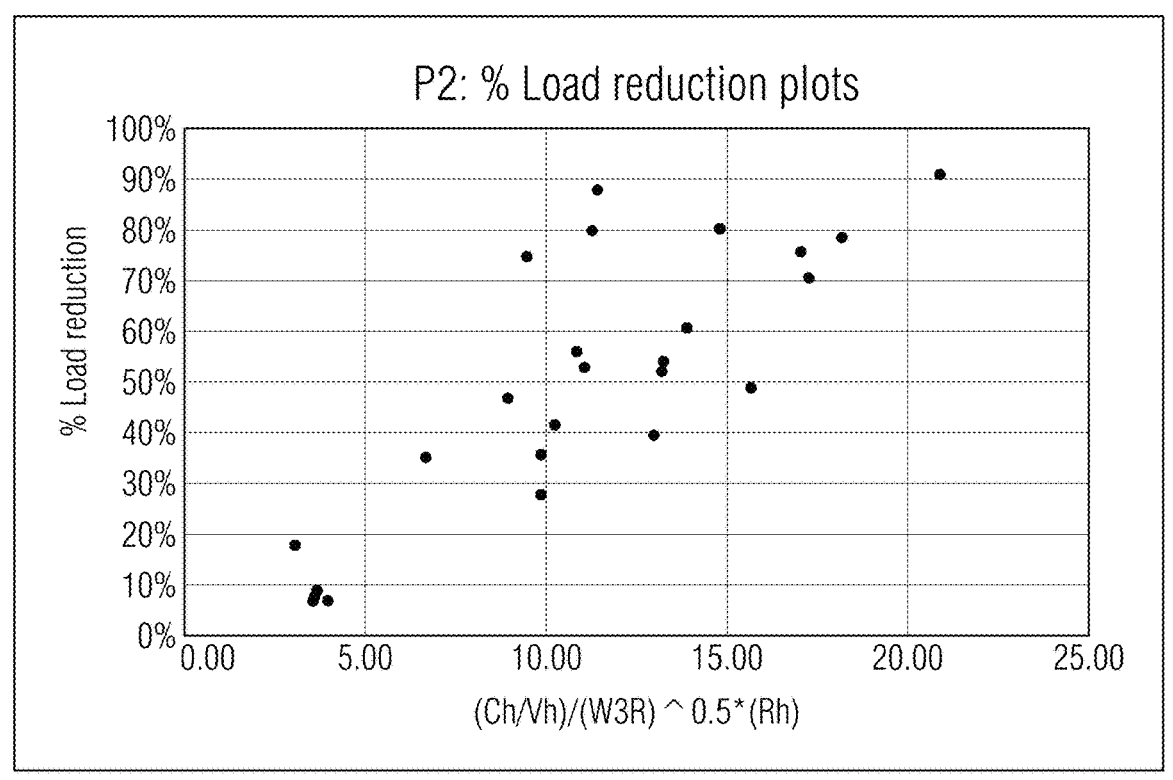
FIG. 6B graphically depicts another resulting percentage of load reduction on a HP spool thrust bearing when the vane of the aft-most stage of the compressor of FIGS. 2A-2B has other particular dimensional characteristics according to one or more aspects described and illustrated herein.

With reference now to FIGS. 1 through 6B, various relationships between operational and architectural characteristics of a turbofan engine and measured load path characteristics are depicted in FIGS. 6A and 6B and shown in the Tables below, particularly with respect to the various features shown and described with respect to FIGS. 2A-2B, 3A-3B, 4A-4D, and 5A-5B. These relationships will be explained in the context of the turbofan engine 100 of FIG. 1 (and particularly the HP compressor 116 of FIG. 2A), but as will be appreciated, these relationships are applicable to turbofans having different configurations.

As noted herein, the HP compressor 116 is particularly designed such that the aft-most stage 202a thereof includes an aft-most vane 186a having particular dimensional characteristics and particular positioning relative to other components, particularly the radially inner surface 296 of the spacer arm 210. Specifically, the components of the aft-most stage 202a are sized and positioned such that the first radial distance Ch in the radial direction R between the first point 272 and a line extending in the axial direction through the midpoint 211 on the radially inner surface 296 of the corresponding spacer arm 210, which is parallel to the longitudinal centerline 102 of the turbofan engine 100 (e.g., a cavity height), can be expressed relative to the second radial distance Vh in the radial direction R between the first point 272 and a line extending in the axial direction through the second point 274 parallel to the longitudinal centerline 102 (e.g., a vane height) as expression (1):

$$\frac{Ch}{Vh} \tag{1}$$

With respect to the aft-most vane 186a, expression (1) above represents a radial length of the aft-most vane 186a and a distance between the tip 264 of the aft-most vane 186a and the radially inner surface 296 of the spacer arm 210 of the compressor. It was found that certain values for expression (1) uniquely identify the advantageous load path noted herein, considering both the penalties and benefits associated with having the divergent flowpath defined by this relationship. Values for expression (1) that result in the advantageous load path through the compressor are between 0.95 and 5.1, and more particularly, between 0.97 and 3.6. Table 1 below depicts a corrected exit flow of fluid from the HP compressor 116 under takeoff conditions (in pound mass per second or lbm/sec), which is expressed as $W_{3R}$, that is observed when the aft-most vane 186a includes dimensional characteristics and spacing according to expression (1):

TABLE 1

| | | | | | | | |
|---|---|---|---|---|---|---|---|
| | | | | Measured corrected flow | | | |
| Engine | Ch (inch) | Vh (inch) | $\frac{Ch}{Vh}$ | $W_{3R}$ (lbm/sec) | Rh (inch) | $\frac{Ch}{Vh} * \frac{Rh}{W_{3R}^{0.5}}$ | % LR |
| 1 | 0.525 | 0.553 | 0.95 | 3.3 | 6.7 | 3.51 | 7% |
| 2 | 1.478 | 0.553 | 2.67 | 3.3 | 6.7 | 9.88 | 28% |
| 3 | 1.948 | 0.553 | 3.52 | 3.3 | 6.7 | 13.02 | 40% |
| 4 | 2.348 | 0.553 | 4.25 | 3.3 | 6.7 | 15.69 | 49% |
| 5 | 2.488 | 0.553 | 4.50 | 3.3 | 6.7 | 16.63 | 53% |
| 6 | 0.586 | 0.617 | 0.95 | 4.4 | 7.9 | 3.57 | 8% |
| 7 | 1.622 | 0.617 | 2.63 | 4.4 | 7.9 | 9.87 | 36% |
| 8 | 2.172 | 0.617 | 3.52 | 4.4 | 7.9 | 13.22 | 52% |
| 9 | 2.842 | 0.617 | 4.61 | 4.4 | 7.9 | 17.30 | 71% |
| 10 | 3.147 | 0.617 | 5.10 | 4.4 | 7.9 | 19.15 | 80% |
| 11 | 0.628 | 0.661 | 0.95 | 4.5 | 6.7 | 3.00 | 18% |
| 12 | 1.403 | 0.661 | 2.12 | 4.5 | 6.7 | 6.71 | 35% |
| 13 | 1.873 | 0.661 | 2.83 | 4.5 | 6.7 | 8.95 | 47% |
| 14 | 2.273 | 0.661 | 3.44 | 4.5 | 6.7 | 10.87 | 56% |
| 15 | 2.975 | 0.661 | 4.50 | 4.5 | 6.7 | 14.22 | 75% |
| 16 | 0.811 | 0.854 | 0.95 | 9.2 | 11.6 | 3.63 | 9% |
| 17 | 2.293 | 0.854 | 2.69 | 9.2 | 11.6 | 10.26 | 42% |
| 18 | 3.113 | 0.854 | 3.65 | 9.2 | 11.6 | 13.93 | 61% |
| 19 | 3.813 | 0.854 | 4.47 | 9.2 | 11.6 | 17.06 | 76% |
| 20 | 4.353 | 0.854 | 5.10 | 9.2 | 11.6 | 19.47 | 88% |
| 21 | 0.872 | 0.918 | 0.95 | 11.3 | 13.8 | 3.91 | 7% |
| 22 | 2.963 | 0.918 | 3.23 | 11.3 | 13.8 | 13.28 | 54% |
| 23 | 4.063 | 0.918 | 4.43 | 11.3 | 13.8 | 18.21 | 79% |
| 24 | 4.663 | 0.918 | 5.08 | 11.3 | 13.8 | 20.90 | 91% |
| 25 | 4.129 | 0.918 | 4.50 | 11.3 | 13.8 | 18.51 | 81% |

The corrected exit flow of fluid from the HP compressor 116 under takeoff conditions ($W_{3R}$) can be expressed according to Expression (2):

$$W_{3R} = W_3 \frac{\left(\frac{T_3}{518.67}\right)^{0.5}}{\frac{P_3}{14.696}} \tag{2}$$

where $W_3$ represents a physical flow of fluid out of the HP compressor 116 at an exit thereof, $T_3$ represents a total temperature (in Rankine) of the fluid at the exit of the HP compressor 116, and $P_3$ represents a total pressure of the fluid at the exit of the HP compressor 116.

Also depicted in Table 1 above is the compressor characteristic referred to in the example as Rh, which represents a radius of the first point 272 with respect to the longitudinal centerline 102 of the engine. % LR as depicted in Table 1 above is the determined percentage of load reduction as measured at the HP spool thrust bearing, which is also depicted graphically in FIG. 6A. The inventors discovered, as is evident in FIG. 6A, that the percentage of load reduction generally increases as the ratio Ch/Vh of expression (1) increases.

Further, the inventors found that the spacer angle θ formed from an intersection of the line passing through points 292 and a line parallel to the longitudinal centerline 102 of the engine can vary from between 0° and 45°, and more particularly between 0° and 25°.

In other embodiments, the components of the aft-most stage 202a are sized and positioned such that the first radial distance Ch in the radial direction R between the first point 272 and a line extending in the axial direction through the midpoint 211, which is parallel to the longitudinal centerline 102 of the turbofan engine 100, can be expressed relative to the second radial distance Vh in the radial direction R between the first point 272 and the second point 274 and the corrected flow of fluid from the HP compressor 116 (in lbm/sec) $W_{3R}$ as expression (3):

$$\frac{Ch}{Vh} * \frac{Rh}{W_{3R}^{0.5}} \tag{3}$$

Expression (3) above expresses a particular radial length of the aft-most vane 186a and distance between the aft-most vane 186a and the spacer arm 210 of the compressor having an advantageous load path noted herein. Values for expression (3) that result in the advantageous load path of the compressor are between 3.0 and 21.0, and more particularly, between 3.0 and 15.

The percentage of load reduction measured at the HP spool thrust bearing is depicted graphically at FIG. 6B. The inventors discovered, as is evident in FIG. 6B, that the percentage of load reduction generally increases as the value of expression (3) increases.

Further, the spacer angle θ formed from an intersection of the line passing through points 292 and a line parallel to the longitudinal centerline 102 of the engine is between 0° and 45°, and more particularly between 0° and 25°.

With the characteristics noted above, the inventors discovered that, as Ch/Vh increases, the divergence of the load-path with respect to the flowpath hub increases, leading to improvement in the form of increased rotor-stator cavity areas, thereby enabling greater aft thrust load generation to reduce the net forward load and reduced centrifugal stresses for the spacer arms, which can lead to improved rotor life for the spacers. In addition, the more particular value combination of Ch/Vh leads to an improved dynamics mode margin and stability due to smoother load-path with improved stiffness.

Further, the inventors discovered that, after Ch/Vh and the spacer angle θ crosses a particular limit, the net rotor thrust would start reversing from the forward to aft direction, and the dynamics stability would also start to deteriorate, which is not acceptable.

Dimensional aspects of the aft-most stator according to expression (3) above are particularly advantageous to address operating condition changes such as variation of the compressor pressure ratio effects.

The inventors also realized various other effects of incorporating features described with respect to FIGS. 3A-3D, 4A-4B, and 5A-5B. Specifically, introduction of a cooling flow of air using the structures depicted in FIGS. 4A-4B allows for directing cooled cooling air to the compressor stages, which improves rotor life. Further, introduction of the various seals described and depicted with respect to FIGS. 3A-3D allows for the tall cavities described herein while at the same time maintaining clearances and stiffness of seals. The seals further improve rotor life, improve acoustic margins, and reduces rotor thrust, which enables better life for architectures. In addition, introduction of a coupling as described with respect to FIGS. 5A and 5B allows for improved torque transfer.

Although specific features of various embodiments may be shown in some drawings and not in others, this is for convenience only. In accordance with the principles of the present disclosure, any feature of a drawing may be referenced and/or claimed in combination with any feature of any other drawing.

This written description uses examples to disclose the present disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

Further aspects are provided by the subject matter of the following clauses:

A compressor, comprising: an outer circumferential support structure and an inner circumferential support structure, the outer and inner circumferential support structures positioned concentrically around a central axis; and an aft-most stage comprising a vane extending radially inward from the outer circumferential support structure, an axial length of the aft-most stage being defined by a spacer arm of the inner circumferential support structure, wherein the vane comprises a root, a tip, and a trailing edge extending between the root and the tip, the root positioned at the outer circumferential support structure, and wherein a ratio of (1) a first radial distance between a first point located at an intersection of the tip of the vane and the trailing edge to a radially inner wall of the spacer arm of the inner circumferential support structure to (2) a second radial distance between the first point and a second point located at an intersection of the root of the vane and the trailing edge is between 0.95 and 5.1.

The compressor according to the previous clause, wherein the ratio is between 0.97 and 3.6.

The compressor according to any one of the previous clauses, further comprising one or more forward stages positioned forward of the aft-most stage, each one of the one or more forward stages comprising a vane having a root extending from the outer circumferential support structure, and a tip, an axial length of each one of the one or more forward stages being defined by additional spacer arms of the inner circumferential support structure.

The compressor according to any one of the previous clauses, wherein an arrangement of a first line extending through intersection points of the spacer arm between adjacent rotors forms an angle with a second line parallel to a longitudinal centerline and wherein the angle is between 0° and 45°.

The compressor according to any one of the previous clauses, wherein the angle is between 0° and 25°.

The compressor according to any one of the previous clauses, further comprising an aft most stage seal positioned adjacent to the tip of the vane.

The compressor according to any one of the previous clauses, wherein the aft most stage seal is a bridge seal, a stick-type seal housing, a box-type seal housing, or incorporates an attached seal ring.

The compressor according to any one of the previous clauses, wherein the spacer arm comprises a first portion and a second portion, the first portion coupled to the second portion via a curvic coupling, a friction joint, or a weld joint The compressor according to any one of the previous clauses, further comprising a blisk positioned aft of the aft-most stage.

The compressor according to any one of the previous clauses, further comprising a stator delivery system positioned aft of the aft-most stage.

A compressor, comprising: an outer circumferential support structure and an inner circumferential support structure, the outer and inner circumferential support structures positioned concentrically around a central axis; and an aft-most stage comprising a vane extending radially inward from the outer circumferential support structure, an axial length of the aft-most stage being defined by a spacer arm of the inner circumferential support structure, wherein the vane comprises a root, a tip, and a trailing edge extending between the root and the tip, the root positioned at the outer circumferential support structure, a flowpath hub radius defined between the longitudinal centerline and the vane tip wherein relative dimensions of the vane are defined by $$\frac{Ch}{Vh} * \frac{Rh}{W_{3R}^{0.5}},$$

where Ch represents a first radial distance between a first point located at an intersection of the tip of the vane and the trailing edge to a radially inner wall of the spacer arm of the inner circumferential support structure, Vh represents a second radial distance between the first point and a second point located at an intersection of the root of the vane and the trailing edge and Rh (in inches) represents a third radial distance between the first point and the longitudinal centerline, and $W_{3R}$ represents a corrected flow of a fluid out of the compressor as defined by:

$$W_{3R} = W_3 * \frac{\left(\frac{T_3}{518.67}\right)^{0.5}}{\frac{P_3}{14.696}},$$

where $W_3$ represents a physical flow of the fluid at a compressor exit, $T_3$ represents a total temperature of the fluid at the compressor exit in Rankine, and $P_3$ represents a total pressure of the fluid at the compressor exit in pounds per square inch absolute (psia).

The compressor according to any one of the previous clauses, wherein $$\frac{Ch}{Vh} * \frac{Rh}{W_{3R}^{0.5}}$$

is between 3.0 and 21.0 or $$\frac{Ch}{Vh} * \frac{Rh}{W_{3R}^{0.5}}$$

is between 3.0 and 15.0.

The compressor according to any one of the previous clauses, further comprising one or more forward stages positioned forward of the aft-most stage, each one of the one or more forward stages comprising a vane having a root extending from the outer circumferential support structure, and a tip, an axial length of each one of the one or more forward stages being defined by additional spacer arms of the inner circumferential support structure.

The compressor according to any one of the previous clauses, wherein an arrangement of a first line extending through intersection points of the spacer arm between adjacent rotors forms an angle with a second line parallel to a longitudinal centerline and wherein the angle is between 0° and 45°.

The compressor according to any one of the previous clauses, wherein the angle is between 0° and 25°.

The compressor according to any one of the previous clauses, further comprising an aft most stage seal positioned adjacent to the tip of the vane.

The compressor according to any one of the previous clauses, wherein the seal is a bridge seal, a stick-type seal housing, a box-type seal housing, or incorporates an attached seal ring.

The compressor according to any one of the previous clauses, wherein the spacer arm comprises a first portion and a second portion, the first portion coupled to the second portion via a curvic coupling, a friction joint, or a weld joint.

The compressor according to any one of the previous clauses, further comprising a blisk positioned aft of the aft-most stage.

The compressor according to any one of the previous clauses, further comprising a stator delivery system positioned aft of the aft-most stage.

We claim:
1. A compressor, comprising:
an outer circumferential support structure;
an inner circumferential support structure positioned radially inward from the outer circumferential support structure, the inner circumferential support structure comprising an aft-most spacer arm and a forward spacer arm, the outer and inner circumferential support structures arranged concentrically around a longitudinal centerline;
an aft-most stage comprising:
an aft-most vane extending radially inward from the outer circumferential support structure, the aft-most vane comprising a root positioned at the outer circumferential support structure and a tip positioned radially inward from the root, and
an aft-most rotor extending radially from the aft-most spacer arm adjacent to the aft-most vane, where an intersection of the aft-most rotor and the aft-most spacer arm defines a centrally located first point; and
a forward stage positioned forward of the aft-most stage, the forward stage comprising:
a forward vane extending radially inward from the outer circumferential support structure, the forward vane comprising a root positioned at the outer cir- cumferential support structure and a tip positioned radially inward from the root, and a forward rotor extending radially from the forward spacer arm adjacent to the forward vane, where an intersection of the forward rotor and the forward spacer arm defines a centrally located second point, wherein an arrangement of a first line extending through the first point and the second point forms an angle with a second line extending parallel to the longitudinal centerline and extending through the tip of the aft-most vane and the tip of the forward vane, the angle being greater than 0° and less than or equal to 45°.

2. The compressor of claim 1, wherein the angle is greater than 0° less than or equal to 25°.

3. The compressor of claim 1, further comprising an aft most stage seal positioned adjacent to the tip of the aft-most vane.

4. The compressor of claim 3, wherein the aft most stage seal is a bridge seal, a stick-type seal housing, a box-type seal housing, or incorporates an attached seal ring.

5. The compressor of claim 1, wherein the aft-most spacer arm comprises a first portion and a second portion, the first portion coupled to the second portion via a curvic coupling, a friction joint, or a weld joint.

6. The compressor of claim 1, wherein the forward spacer arm comprises a first portion and a second portion, the first portion coupled to the second portion via a curvic coupling, a friction joint, or a weld joint.

7. The compressor of claim 1, wherein the aft-most stage further comprises a circumferentially bladed disk, an axially bladed disk, or a blisk.

8. A turbofan engine, comprising:

a fan section; and a core turbine engine disposed downstream of the fan section, the core turbine engine comprising a compressor, wherein the compressor comprises:

an outer circumferential support structure;

an inner circumferential support structure positioned radially inward from the outer circumferential support structure, the inner circumferential support structure comprising an aft-most spacer arm and a forward spacer arm, the outer and inner circumferential support structures arranged concentrically around a longitudinal centerline;

an aft-most stage comprising:

an aft-most vane extending radially inward from the outer circumferential support structure, the aft-most vane comprising a root positioned at the outer circumferential support structure and a tip positioned radially inward from the root, and an aft-most rotor extending radially from the aft-most spacer arm adjacent to the aft-most vane, where an intersection of the aft-most rotor and the aft-most spacer arm defines a centrally located first point; and a forward stage positioned forward of the aft-most stage, the forward stage comprising:

a forward vane extending radially inward from the outer circumferential support structure, the forward vane comprising a root positioned at the outer circumferential support structure and a tip positioned radially inward from the root, and a forward rotor extending radially from the forward spacer arm adjacent to the forward vane, where an intersection of the forward rotor and the forward spacer arm defines a centrally located second point, wherein an arrangement of a first line extending through the first point and the second point forms an angle with a second line extending parallel to the longitudinal centerline and extending through the tip of the aft-most vane and the tip of the forward vane, the angle being greater than 0° and less than or equal to 45°.

9. The turbofan engine of claim 8, wherein the angle is greater than 0° less than or equal to 25°.

10. The turbofan engine of claim 8, wherein the compressor further comprises an aft most stage seal positioned adjacent to the tip of the aft-most vane.

11. The turbofan engine of claim 10, wherein the aft most stage seal is a bridge seal, a stick-type seal housing, a box-type seal housing, or incorporates an attached seal ring.

12. The turbofan engine of claim 8, wherein the aft-most spacer arm comprises a first portion and a second portion, the first portion coupled to the second portion via a curvic coupling, a friction joint, or a weld joint.

13. The turbofan engine of claim 8, wherein the forward spacer arm comprises a first portion and a second portion, the first portion coupled to the second portion via a curvic coupling, a friction joint, or a weld joint.

14. The turbofan engine of claim 8, wherein the aft-most stage further comprises a circumferentially bladed disk, an axially bladed disk, or a blisk.

* * * * *